US011399283B2

(12) United States Patent
Anantha et al.

(10) Patent No.: US 11,399,283 B2
(45) Date of Patent: Jul. 26, 2022

(54) TENANT SERVICE SET IDENTIFIERS (SSIDS)

(71) Applicant: Cisco Technology, Inc., San Jose, CA (US)

(72) Inventors: Swaminathan Anantha, Mountain View, CA (US); Mickael James Graham, Bellevue Hill (AU); Anvesh Reddy Podduturi, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 296 days.

(21) Appl. No.: 16/546,014

(22) Filed: Aug. 20, 2019

(65) Prior Publication Data

US 2020/0162917 A1    May 21, 2020

Related U.S. Application Data

(60) Provisional application No. 62/770,416, filed on Nov. 21, 2018.

(51) Int. Cl.
| H04W 12/069 | (2021.01) |
| H04W 76/11 | (2018.01) |
| H04L 9/40 | (2022.01) |
| H04W 4/80 | (2018.01) |
| H04W 84/12 | (2009.01) |

(52) U.S. Cl.
CPC ....... *H04W 12/069* (2021.01); *H04L 63/0807* (2013.01); *H04L 63/0892* (2013.01); *H04W 4/80* (2018.02); *H04W 76/11* (2018.02); *H04W 84/12* (2013.01)

(58) Field of Classification Search
CPC .............................. H04W 12/06; H04W 12/08
See application file for complete search history.

(56) References Cited

U.S. PATENT DOCUMENTS

| 8,532,304 | B2 | 9/2013 | Asokan et al. |
| 9,781,696 | B1* | 10/2017 | Soave .................. H04W 60/04 |
| 9,980,213 | B2 | 5/2018 | Lynch et al. |
| 2012/0077468 | A1* | 3/2012 | Fan .................... G07C 9/00857 |
| | | | 455/414.1 |
| 2012/0170559 | A1* | 7/2012 | Feinberg ................. H04L 63/18 |
| | | | 370/338 |
| 2013/0058274 | A1 | 3/2013 | Scherzer et al. |
| 2014/0007209 | A1* | 1/2014 | Zucker ................. H04W 12/06 |
| | | | 726/7 |

(Continued)

*Primary Examiner* — Wen W Huang
(74) *Attorney, Agent, or Firm* — Polsinelli PC

(57) ABSTRACT

Systems and methods provide for provisioning network access using a tenant service set identifier (SSID) or an SSID of a specified duration and distributed authorization. A network management system can provision a wireless local area network (WLAN) and the SSID in an access point to enable a primary guest device to access the WLAN for a specified time period (e.g., a start time and end time). The network management system can cause the SSID and authentication data (e.g., authentication token, Pre-Shared Key (PSK), etc.) to be transmitted for receipt by the first client device. After the start time and in response to successfully authenticating the first client device, the first client device can authorize a second client device to access the WLAN. The network management system or the AP can disable access to the network via the SSID at the end time.

20 Claims, 18 Drawing Sheets

(56) References Cited

U.S. PATENT DOCUMENTS

| | | | |
|---|---|---|---|
| 2014/0071970 A1 | 3/2014 | Velasco | |
| 2015/0350911 A1* | 12/2015 | Pallen | H04W 12/08 |
| | | | 726/3 |
| 2016/0037338 A1 | 2/2016 | Venkiteswaran et al. | |
| 2016/0345208 A1* | 11/2016 | Gates | H04W 12/02 |
| 2017/0374692 A1* | 12/2017 | Currie | H04W 48/02 |
| 2019/0037613 A1* | 1/2019 | Anantharaman | H04W 12/06 |
| 2019/0104411 A1* | 4/2019 | Hotchkiss | H04W 12/08 |
| 2019/0182672 A1* | 6/2019 | Kuenzi | H04W 12/121 |

* cited by examiner

FIG. 3D

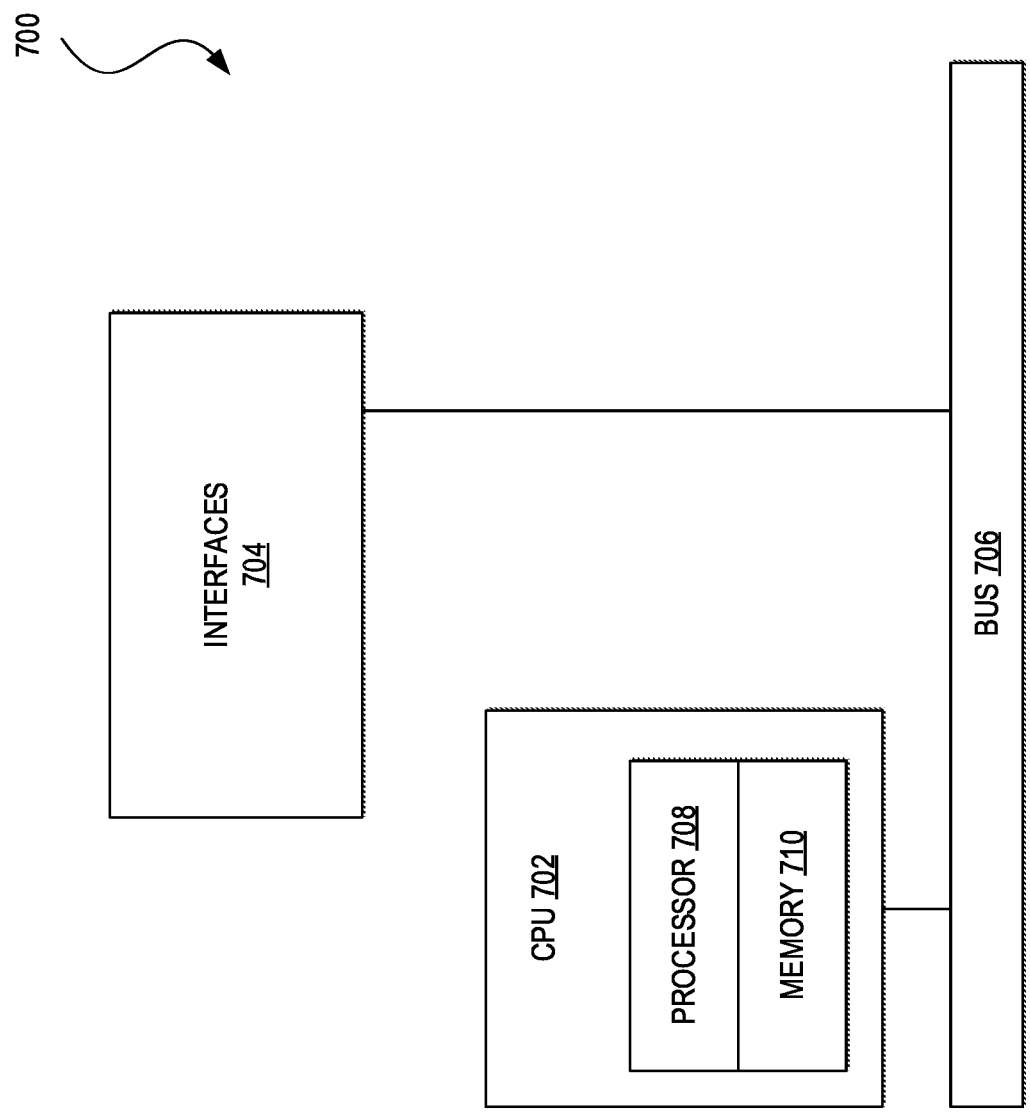

US 11,399,283 B2

TENANT SERVICE SET IDENTIFIERS (SSIDS)

CROSS-REFERENCE TO RELATED APPLICATIONS

This application claims priority to U.S. Provisional Patent Application No. 62/770,416, filed on Nov. 21, 2018, the content of which is incorporated herein by reference in its entirety.

TECHNICAL FIELD

The subject matter of this disclosure relates in general to the field of computer networking, and more particularly, to systems and methods for providing network access using tenant service set identifiers (SSIDs) or SSIDs of specified duration and distributed authorization.

BACKGROUND

Homestays and other shared use spaces are becoming increasingly popular with consumers because of the convenience, cost-savings, and unique experiences these spaces can provide. In addition to the spaces themselves, consumers may expect the availability of certain services and amenities, such as Internet access, automatic entry (e.g., smart door locks, smart garage door openers, etc.), printing, smart lights, smart thermostats, and so forth. A host may also want to provide these services and amenities to attract guests but must be able to limit access to only those periods of time that guests are authorized to use the shared space.

Institute of Electrical and Electronic Engineers (IEEE) standards provide different ways for a host to offer guests connectivity to a host network and devices (e.g., smart door locks, printers, etc.). For example, IEEE 802.11 wireless local area networking standards enable the host to define a service set or group of wireless network devices to operate under the same or similar networking parameters. A service set can be associated with a service set identifier (SSID) and password. The host can grant access to his/her network and devices by distributing the SSID and password to the guests. However, SSIDs have indefinite durations and require the host to manually deactivate an SSID and/or change the password to prohibit access to previously authorized guests and to manually create and distribute a new SSID and/or password to grant access to new guests. This can be a burdensome process and errors occurring during the process can pose a serious security threat.

BRIEF DESCRIPTION OF THE FIGURES

To provide a more complete understanding of the present disclosure and features and advantages thereof, reference is made to the following description, taken in conjunction with the accompanying drawings, in which:

FIGS. 3A-3I illustrate examples of graphical user interfaces for a network management system in accordance with an embodiment;

FIG. 7 illustrates an example of a network device in accordance with an embodiment.

DESCRIPTION OF EXAMPLE EMBODIMENTS

Figure 1:
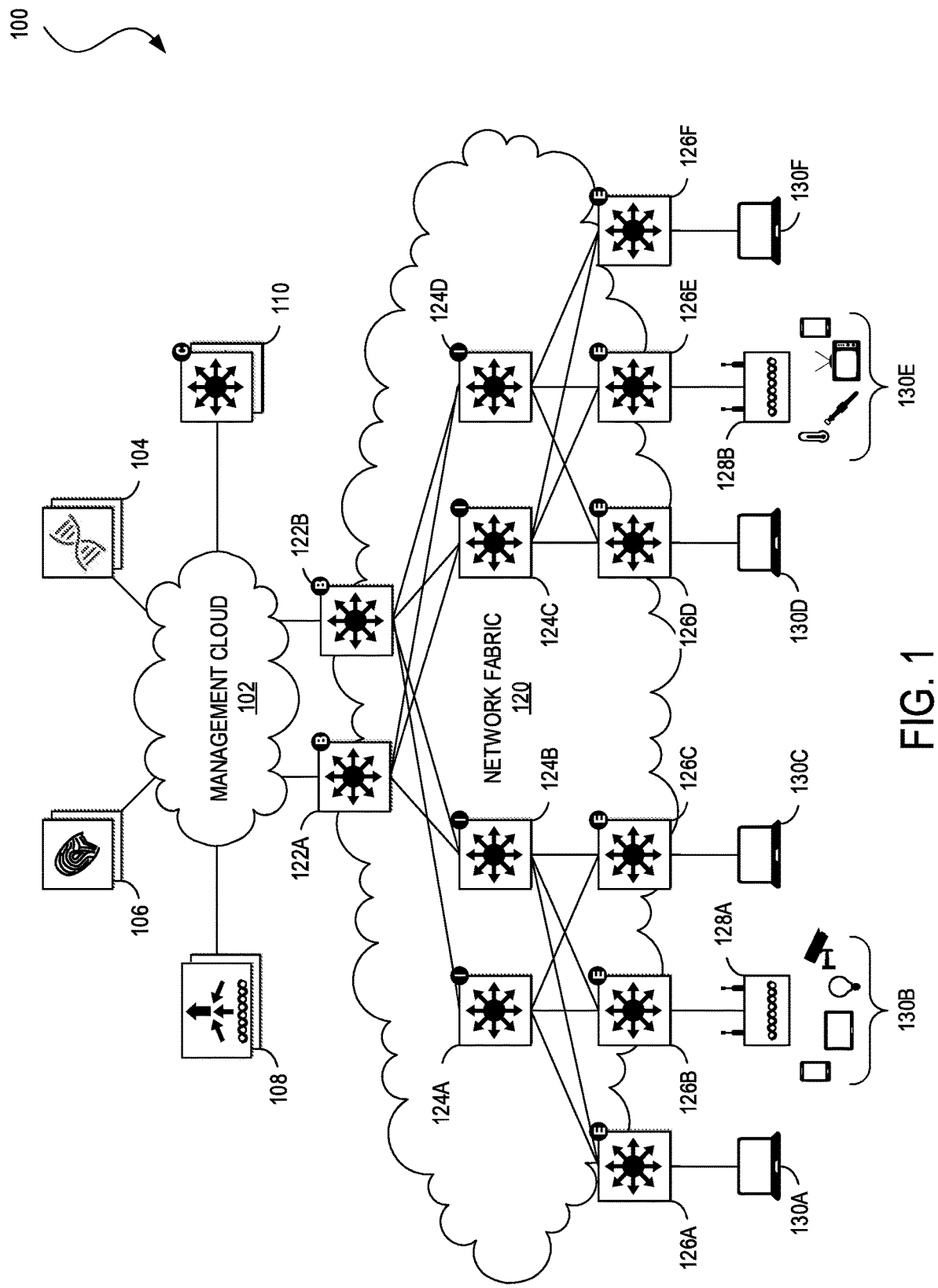
FIG. 1 illustrates an example of a physical topology of an enterprise network in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

It can be mutually beneficial for a host or landlord of a homestay, shared office, or other shared use space to grant guests or lessees with Internet access and access to other devices that may be operating in the shared use space (e.g., automatic entry devices, office equipment, etc.). The host can provide a more attractive shared space offering these services and amenities, and the guests are the direct beneficiaries of these services and amenities. For example, Internet access is increasingly expected to be available in shared use spaces as much other utility resources like water, gas, electricity, and so forth. Automated entry can also be beneficial because of the convenience it can provide to both the host and guests not having to exchange physical keys. In addition, the guests may have multiple devices that may need Wi-Fi access for the Internet and Wi-Fi-enabled devices. Having the host configure the wireless local area network (WLAN) to allow access to new guests every few days can be burdensome and can create security risks if access is not denied to previous guests. Further, it is a best security practice to change Wi-Fi credentials for every guest visit, particularly when Wi-Fi access may be used for physical access to the shared use space.

In shared office spaces, there can be multiple organizations working in the same space, and it may be beneficial to have a single Wi-Fi backhaul or common wireless network infrastructure that can be shared by the organizations. This can limit Wi-Fi pollution because each organization may no longer require its own Wi-Fi access points. For this to function, however, each organization in the shared office space must somehow be able to configure and manage its own SSID. But current WLAN systems do not provide these capabilities.

Various embodiments of the present disclosure can overcome deficiencies with these and other prior art approaches for provisioning network access by enabling creation of tenant service set identifiers (SSIDs) or SSIDs of specified duration and distributed authorization. A network management system (e.g., including at least one network controller, wireless local area network (WLAN) controller (WLC), and network node and sometimes including one or more authentication, authorization, and accounting (AAA) servers) can provision a WLAN and an SSID in one or more access points (APs) to automatically grant access to the WLAN to one or more primary guest devices (e.g., smart phone, tablet, laptop, wearable device, etc.) for a specified time period when the primary guest device(s) are within a range (e.g., Wi-Fi range, Bluetooth® range, visual range, etc.) of a shared use space in which the AP(s) are located (e.g., the WLAN). For example, the network management system can generate instructions (e.g., a script, API, configuration management tool workflow, etc.) for the AP(s) to activate the SSID at a specified start time and disable the SSID at the specified end time. The activation instructions can be executed by the network management system or by the AP(s) at the specified start and end times. Alternatively, or in addition, the network management system can create a Pre-Shared Key (PSK) group that is operative from the specified start time to the specified end time and associate the PSK with the primary guest device(s) and SSID. The network management system can transmit the SSID and authentication data (e.g., an SSID authentication token, PSK, etc.) for receipt by the primary guest device(s). When the primary device(s) connect to the AP(s) based on the received SSID and authentication data, the AP(s) can distribute authorization to access the network by enabling the primary guest device(s) to control access of one or more secondary guest devices to the SSID. For example, when a secondary guest device attempts to connect to the AP(s) via the SSID, the AP(s) can send a request to the primary guest device to authorize the secondary guest device to access the SSID. Various other functions and advantages are described and suggested below as may be provided in accordance with the various embodiments.

Example Embodiments

FIG. 1 illustrates an example of a physical topology of an enterprise network 100. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
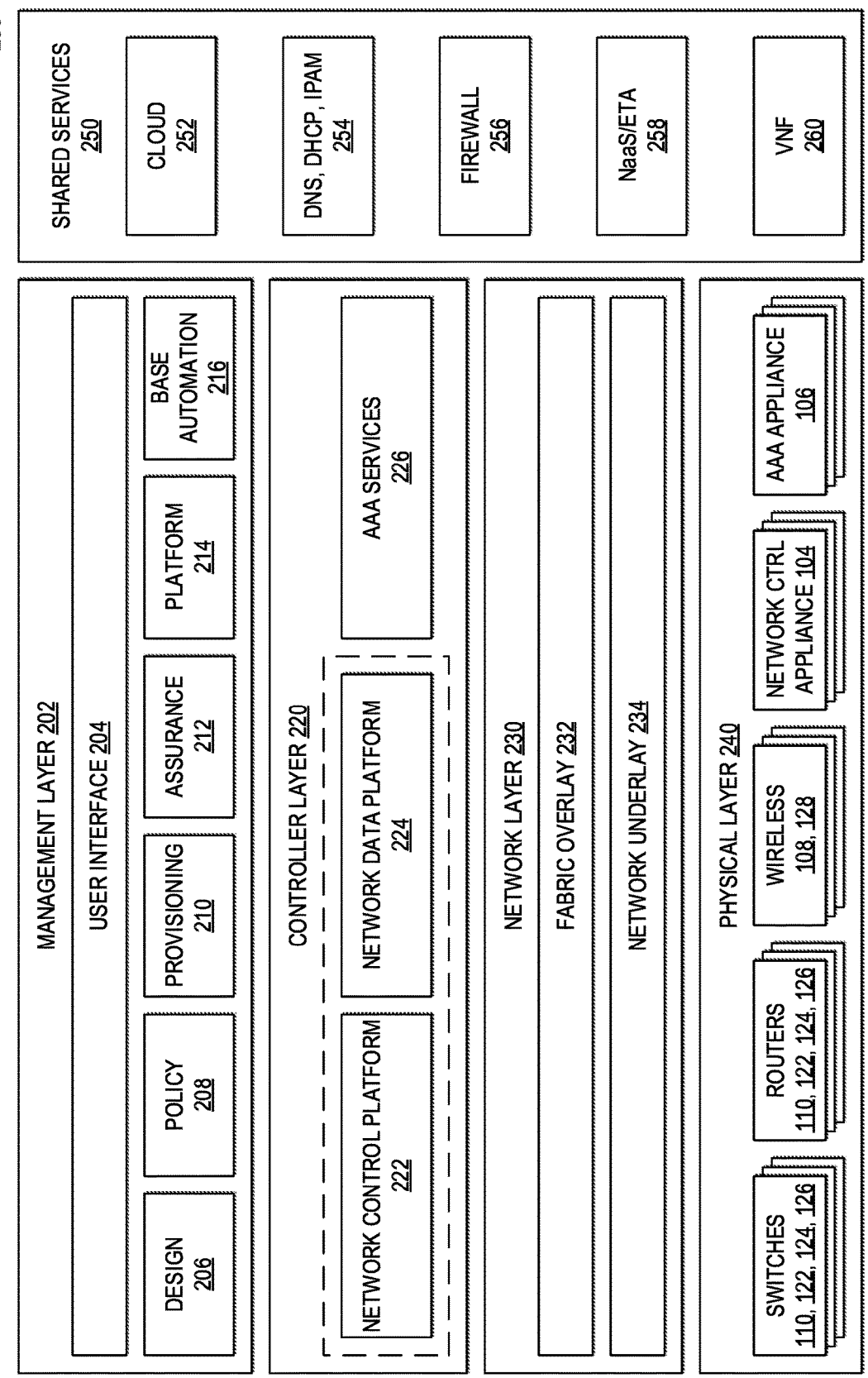
FIG. 2 illustrates an example of a logical architecture for an enterprise network in accordance with an embodiment.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), gRPC Remote Procedure Calls (gRPC), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

Figure 3A:
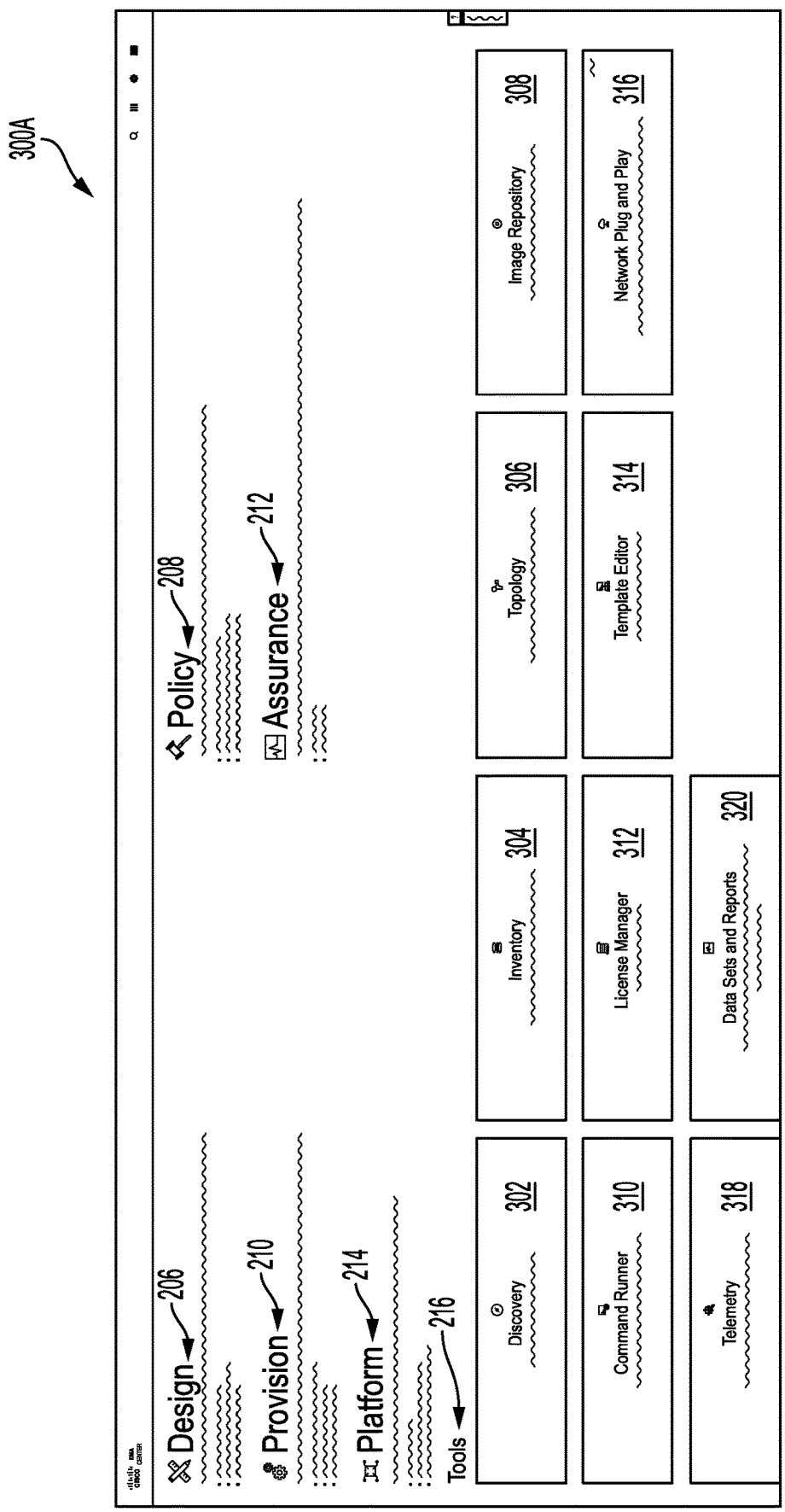

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

A network discovery tool 302 for automating the discovery of existing network elements to populate into inventory;

An inventory management tool 304 for managing the set of physical and virtual network elements;

A topology tool 306 for visualizing the physical topology of network elements;

An image repository tool 308 for managing software images for network elements;

A command runner tool 310 for diagnosing one or more network elements based on a CLI;

A license manager tool 312 for administering visualizing software license usage in the network;

A template editor tool 314 for creating and authoring CLI templates associated with network elements in a design profile;

A network PnP tool 316 for supporting the automated configuration of network elements;

A telemetry tool 318 for designing a telemetry profile and applying the telemetry profile to network elements; and A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

Figure 3B:
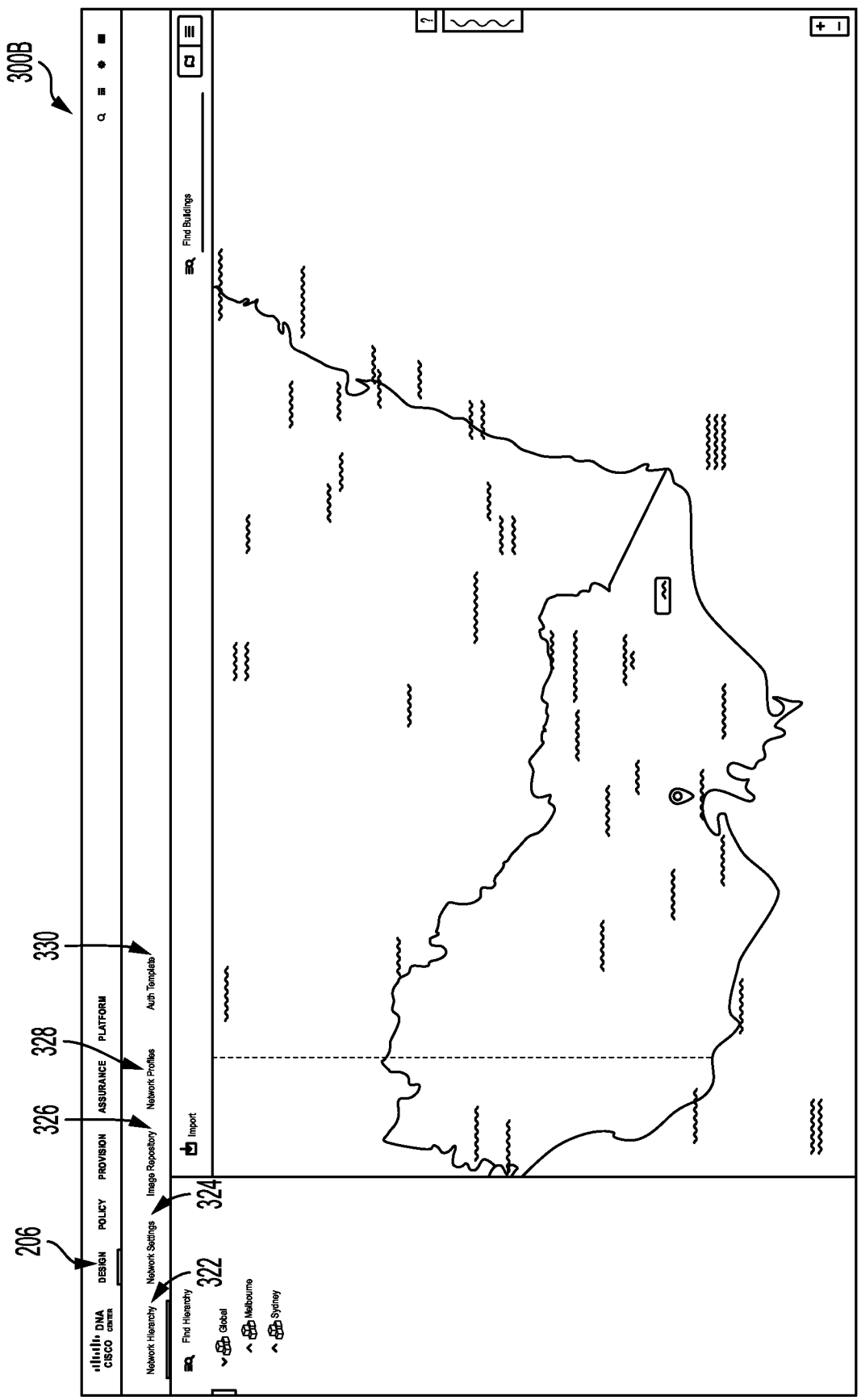

FIG. 3B illustrates a graphical user interface 300B, an example of a landing screen for the design functions 206. The graphical user interface 300B can include user interface elements for various tools and workflows for logically defining an enterprise network. In this example, the design tools and workflows include:

A network hierarchy tool 322 for setting up the geographic location, building, and floor plane details, and associating these with a unique site id;

A network settings tool 324 for setting up network servers (e.g., Domain Name System (DNS), DHCP, AAA, etc.), device credentials, IP address pools, service provider profiles (e.g., QoS classes for a WAN provider), and wireless settings;

An image management tool 326 for managing software images and/or maintenance updates, setting version compliance, and downloading and deploying images;

A network profiles tool 328 for defining LAN, WAN, and WLAN connection profiles (including Service Set Identifiers (SSIDs)); and An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
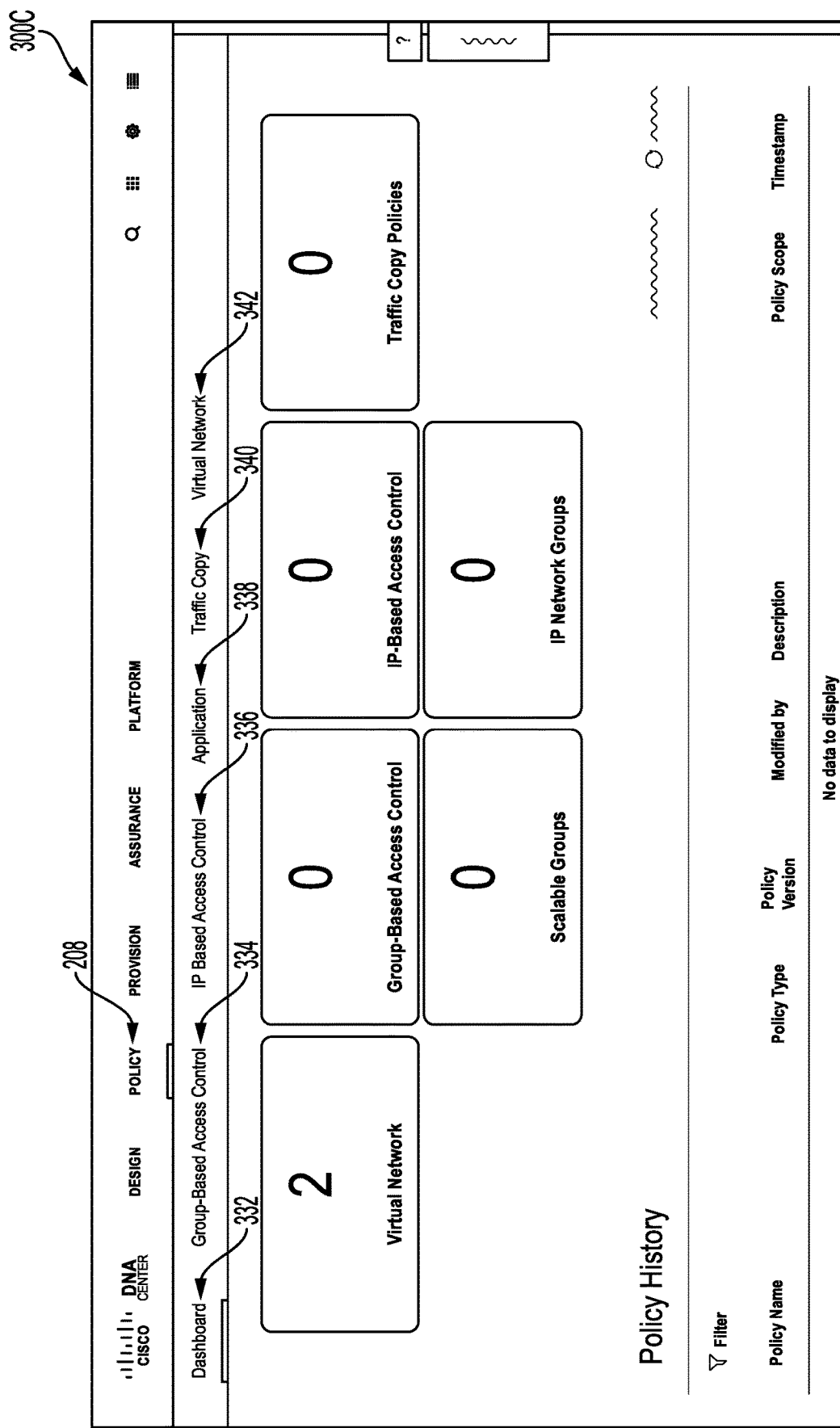

FIG. 3C illustrates a graphical user interface 300C, an example of a landing screen for the policy functions 208. The graphical user interface 300C can include various tools and workflows for defining network policies. In this example, the policy design tools and workflows include:

A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes, user who has modified the policy, description, policy scope (e.g., user and device groups or applications that the policy affects), and timestamp;

A group-based access control policies tool 334 for managing group-based access controls or SGACLs. A group-based access control policy can define scalable groups and an access contract (e.g., rules that make up the access control policies, such as permit or deny when traffic matches on the policy);

An IP-based access control policies tool 336 for managing IP-based access control policies. An IP-based access control can define an IP network group (e.g., IP subnets that share same access control requirements) and an access contract;

An application policies tool 338 for configuring QoS for application traffic. An application policy can define application sets (e.g., sets of applications that with similar network traffic needs) and a site scope (e.g., the site to which an application policy is defined);

A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

Figure 3D:
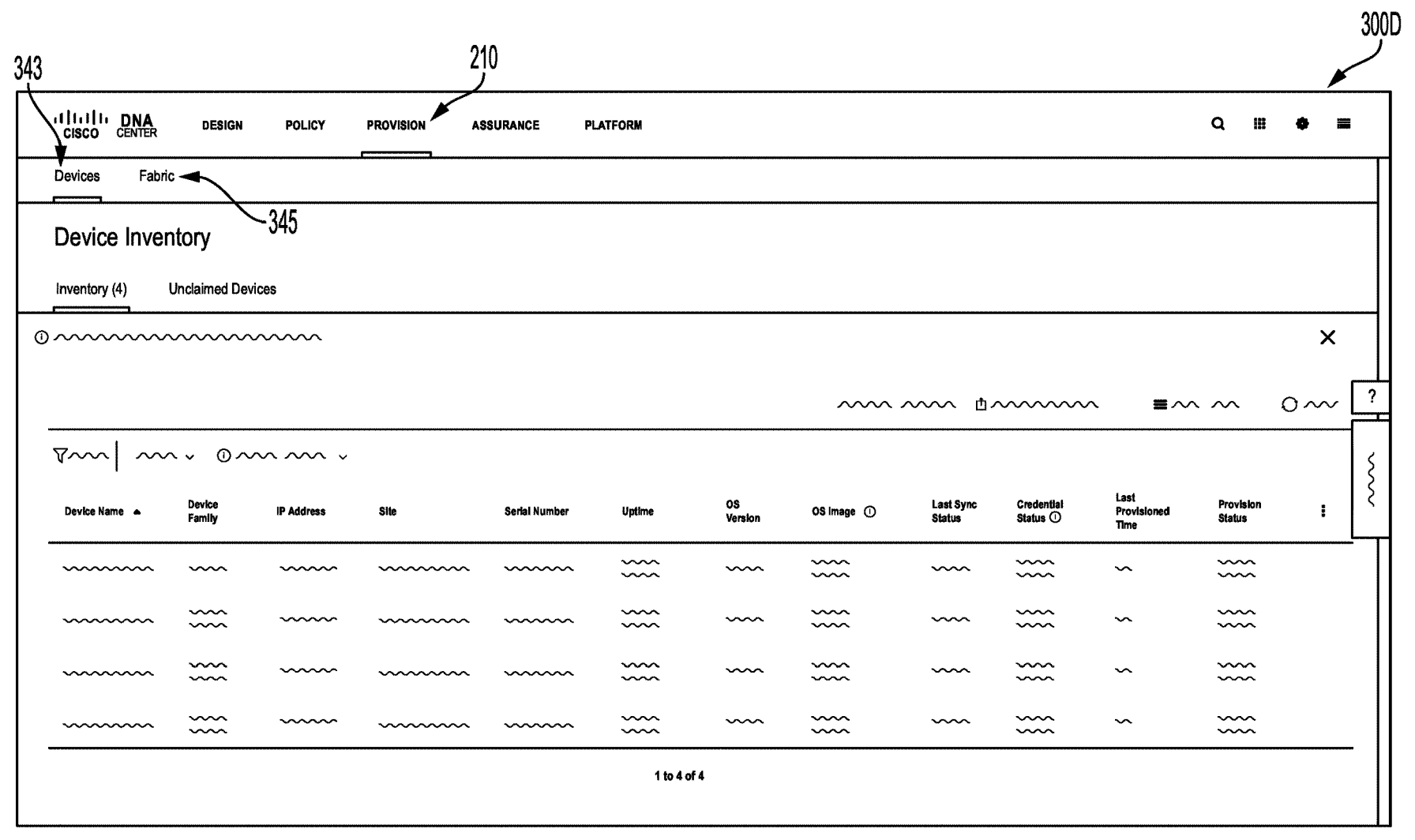

FIG. 3D illustrates a graphical user interface 300D, an example of a landing screen for the provisioning functions 210. The graphical user interface 300D can include various tools and workflows for deploying the network. In this example, the provisioning tools and workflows include:

A device provisioning tool 343 for assigning devices to the inventory and deploying the required settings and policies, and adding devices to sites; and A fabric provisioning tool 345 for creating fabric domains and adding devices to the fabric.

The output of the provisioning workflow 210 can include the deployment of the network underlay and fabric overlay, as well as policies (defined in the policy workflow 208).

Figure 3E:
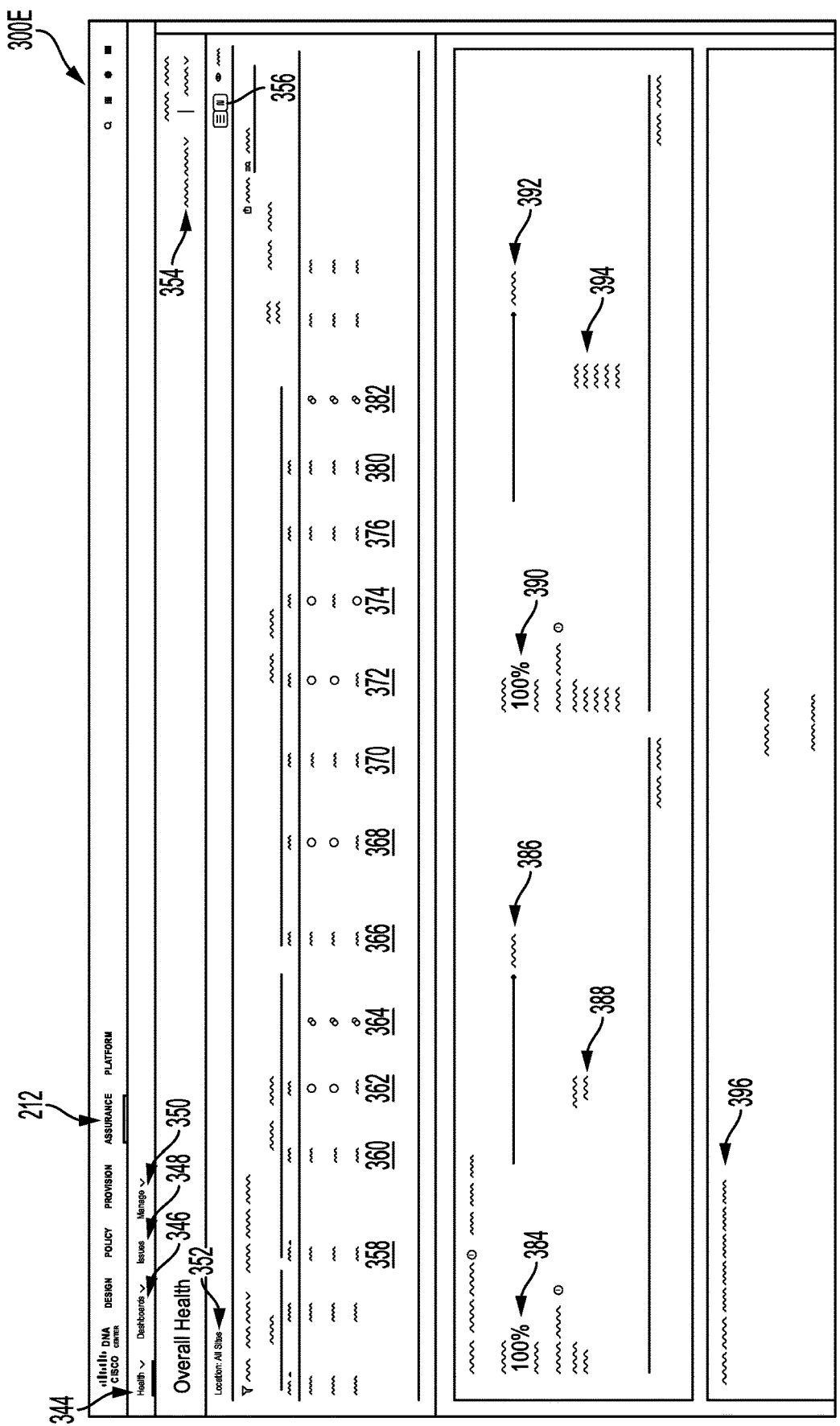

FIG. 3E illustrates a graphical user interface 300E, an example of a landing screen for the assurance functions 212. The graphical user interface 300E can include various tools and workflows for managing the network. In this example, the assurance tools and workflows include:

A health overview tool 344 for providing a global view of the enterprise network, including network devices and endpoints. The user interface element (e.g., drop-down menu, a dialog box, etc.) associated with the health overview tool 344 can also be toggled to switch to additional or alternative views, such as a view of the health of network devices alone, a view of the health of all wired and wireless clients, and a view of the health of applications running in the network as discussed further below with respect to FIGS. 3F-3H;

An assurance dashboard tool 346 for managing and creating custom dashboards;

An issues tool 348 for displaying and troubleshooting network issues; and

A sensor management tool 350 for managing sensor-driven tests.

The graphical user interface 300E can also include a location selection user interface element 352, a time period selection user interface element 354, and a view type user interface element 356. The location selection user interface element 354 can enable a user to view the overall health of specific sites (e.g., as defined via the network hierarchy tool 322) and/or network domains (e.g., LAN, WLAN, WAN, data center, etc.). The time period selection user interface element 356 can enable display of the overall health of the network over specific time periods (e.g., last 3 hours, last 24 hours, last 7 days, custom, etc.). The view type user interface element 355 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network devices by score, color, descriptor, and so forth; and column 380 can include user interface elements for drilling down to the health of the network devices associated with a hierarchical site/building. In other embodiments, client devices may be grouped in other ways besides wired or wireless, such as by device type (e.g., desktop, laptop, mobile phone, IoT device or more specific type of IoT device, etc.), manufacturer, model, operating system, and so forth. Likewise, network devices can also be grouped along these and other ways in additional embodiments.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network devices as a percentage, a color coded trend chart 392 indicating that percentage over a specific time period, and a user interface element 394 breaking down the number of network devices as a percentage by network device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
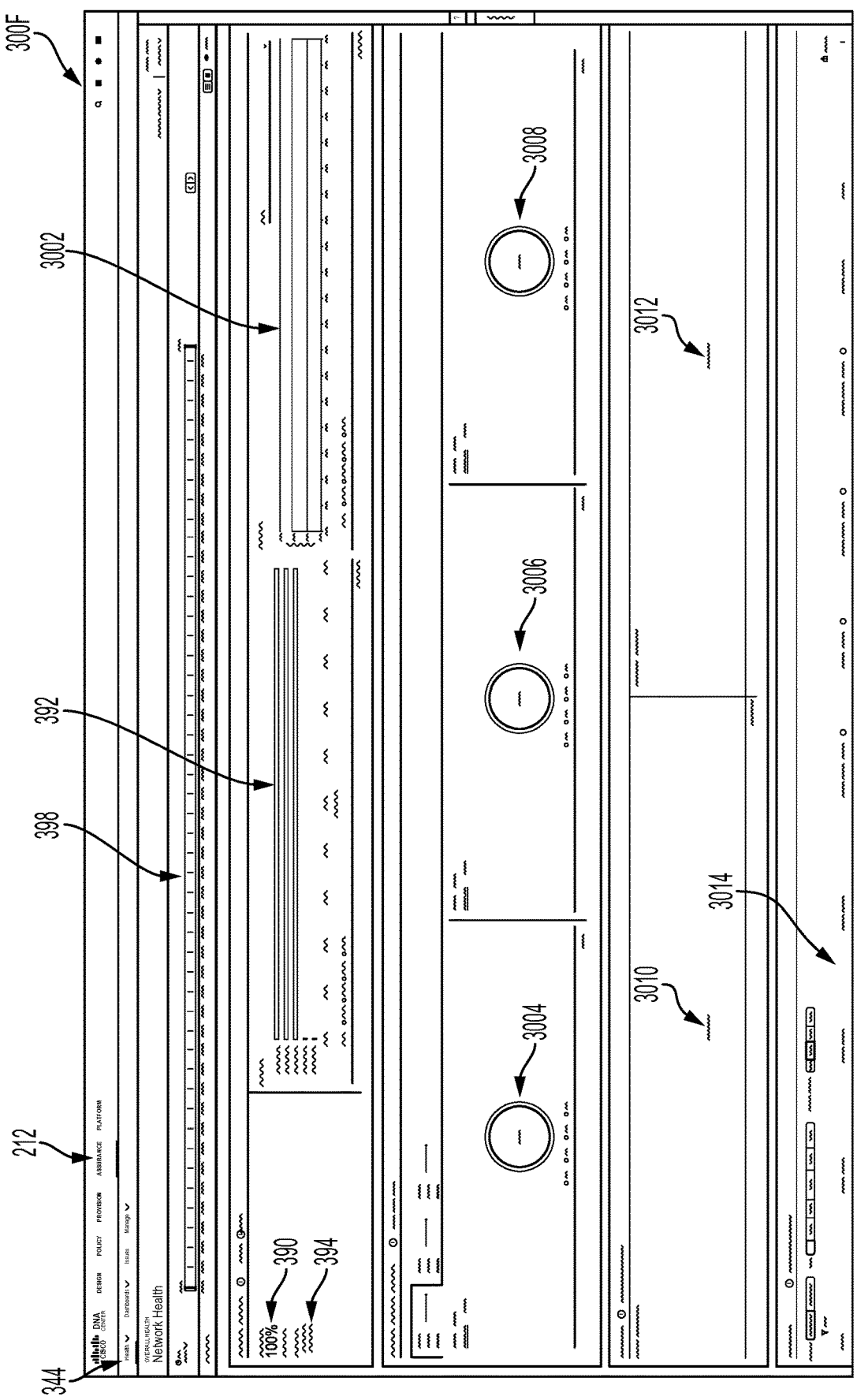

FIG. 3F illustrates a graphical user interface 300F, an example of a screen for an overview of the health of network devices alone, which may be navigated to, for instance, by toggling the health overview tool 344. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network devices) (not shown here), the number of healthy network devices as a percentage 390, the color coded trend charts 392 indicating that percentage by device type, the breakdown of the number of healthy network devices by device type 394, and so forth. In addition, the graphical user interface 300F can display a view of the health of network devices by network topology (not shown). This view can be interactive, such as by enabling a user to zoom in or out, pan left or right, or rotate the topology (e.g., by 90 degrees).

In this example, the graphical user interface 300F also includes a color coded trend chart 3002 showing the performance of the network devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network device can also be provided by selecting that network device in the network devices table 3014.

Figure 3G:
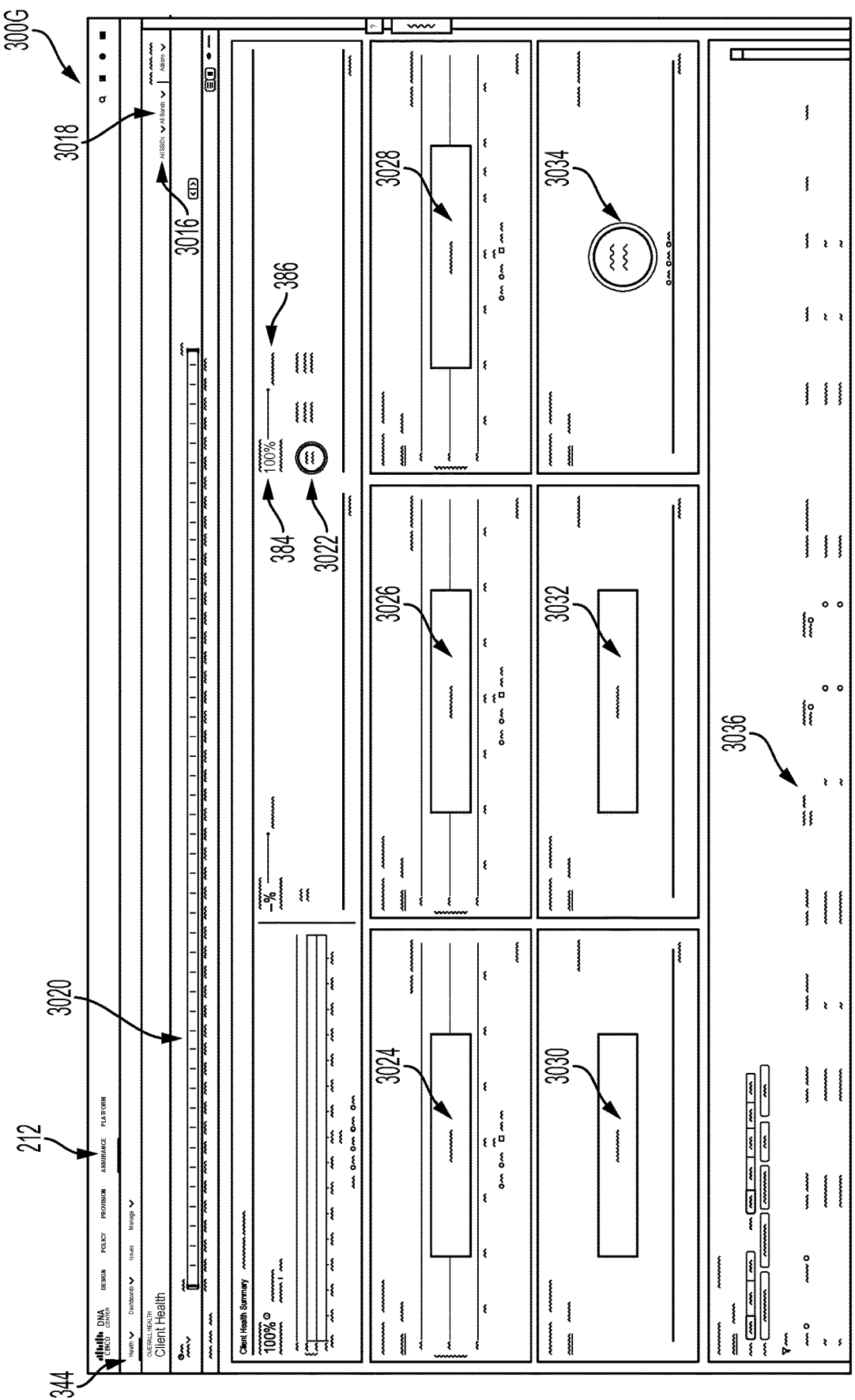

FIG. 3G illustrates a graphical user interface 300G, an example of a screen for an overview of the health of client devices, which may be navigated to, for instance, by toggling the health overview tool 344. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a time slider 3020 that may operate similarly to the time slider 398.

The graphical user interface 300G can also include a client health summary user interface element that provides similar information to that shown in the graphical user interface 300E, such as the number of healthy clients as a percentage 384 and a color coded trend chart 386 indicating that percentage over a specific time period for each grouping of client devices (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) client devices. The count of client devices associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:

Client onboarding times 3024;
Received Signal Strength Indications (RSSIs) 3026;
Connectivity signal-to-noise ratios (SNRs) 3028;
Client counts per SSID 3030;

Client counts per band frequency 3032;

DNS requests and response counters (not shown); and

Connectivity physical link state information 3034 indicating the distribution of wired client devices that had their physical links up, down, and had errors.

In addition, the graphical user interface 300G can include a client devices table 3036 enabling a user to filter (e.g., by device type, health, data (e.g., onboarding time>threshold, association time>threshold, DHCP>threshold, AAA>threshold, RSSI>threshold, etc.), or custom filters), view, and export client device information (e.g., user identifier, hostname, MAC address, IP address, device type, last heard, location, VLAN identifier, SSID, overall health score, onboarding score, connection score, network device to which the client device is connected, etc.). A detailed view of the health of each client device can also be provided by selecting that client device in the client devices table 3036.

Figure 3H:
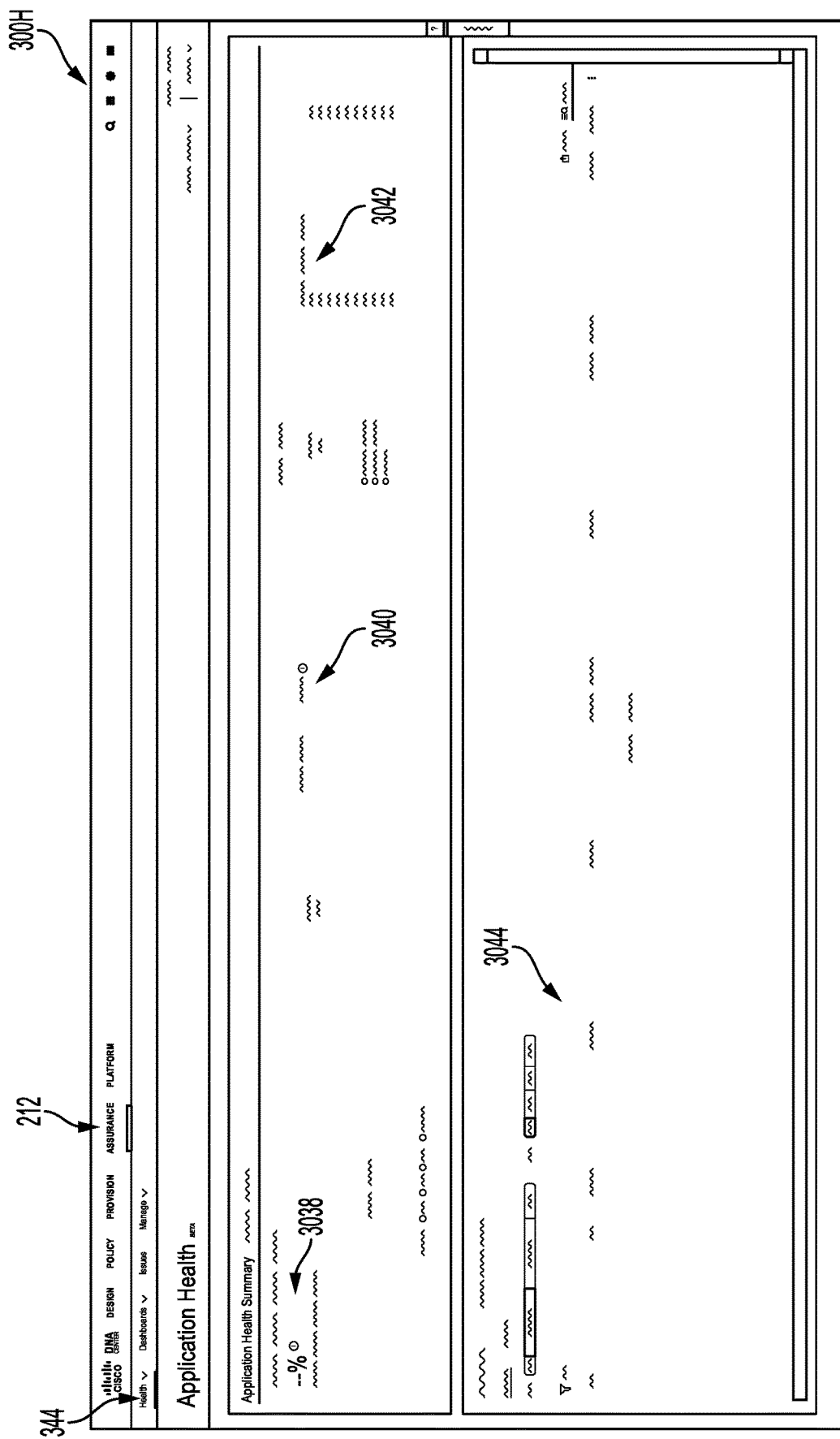

FIG. 3H illustrates a graphical user interface 300H, an example of a screen for an overview of the health of applications, which may be navigated to, for instance, by the toggling the health overview tool 344. The graphical user interface 300H can include application health summary user interface element including a percentage 3038 of the number of healthy applications as a percentage, a health score 3040 for each application or type of application (e.g., business relevant, business irrelevant, default; HTTP, VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

Figure 3I:
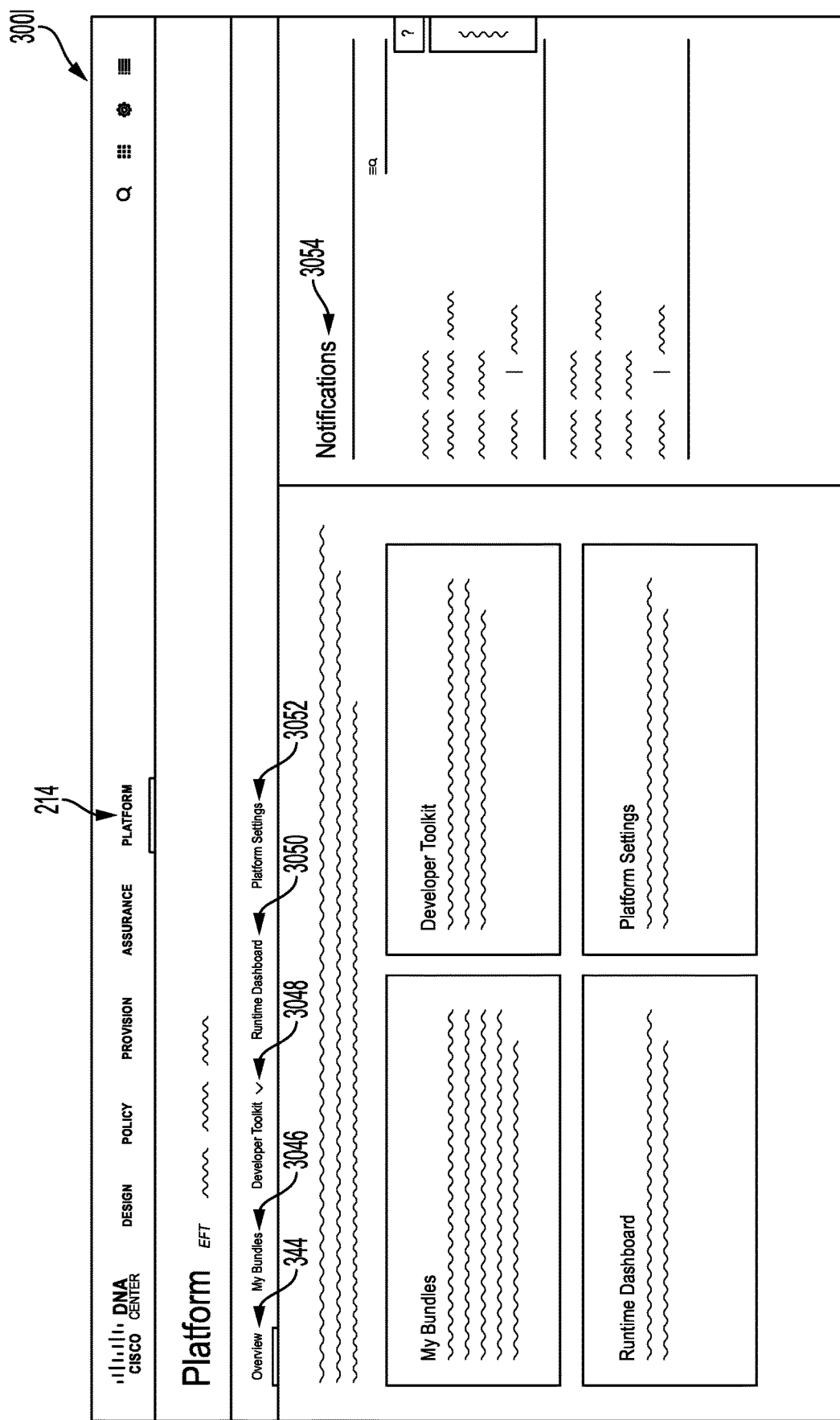

FIG. 3I illustrates an example of a graphical user interface 3001, an example of a landing screen for the platform functions 210. The graphical user interface 300C can include various tools and workflows for integrating with other technology systems. In this example, the platform integration tools and workflows include:

A bundles tool 3046 for managing packages of domain-specific APIs, workflows, and other features for network programming and platform integration;

A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;

A runtime dashboard 3050 for viewing and analyzing basic metrics or API and integration flow usage;

A platform settings tool 3052 to view and set global or bundle-specific settings that define integration destinations and event consumption preferences; and A notifications user interface element 3054 for presenting notifications regarding the availability of software updates, security threats, and so forth.

Returning to FIG. 2, the controller layer 220 can comprise subsystems for the management layer 220 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network control platform 230 can provide the design functions 206, the provisioning functions 210, the platform functions 214, and the base automation functions 216. In addition, the network control platform 230 can include tools and workflows for discovering switches, routers, wireless controllers, and other network devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/YANG Data Modeling Language, Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 210, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay may use any topology and routing protocol.

In some embodiments, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can comprise network devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4:
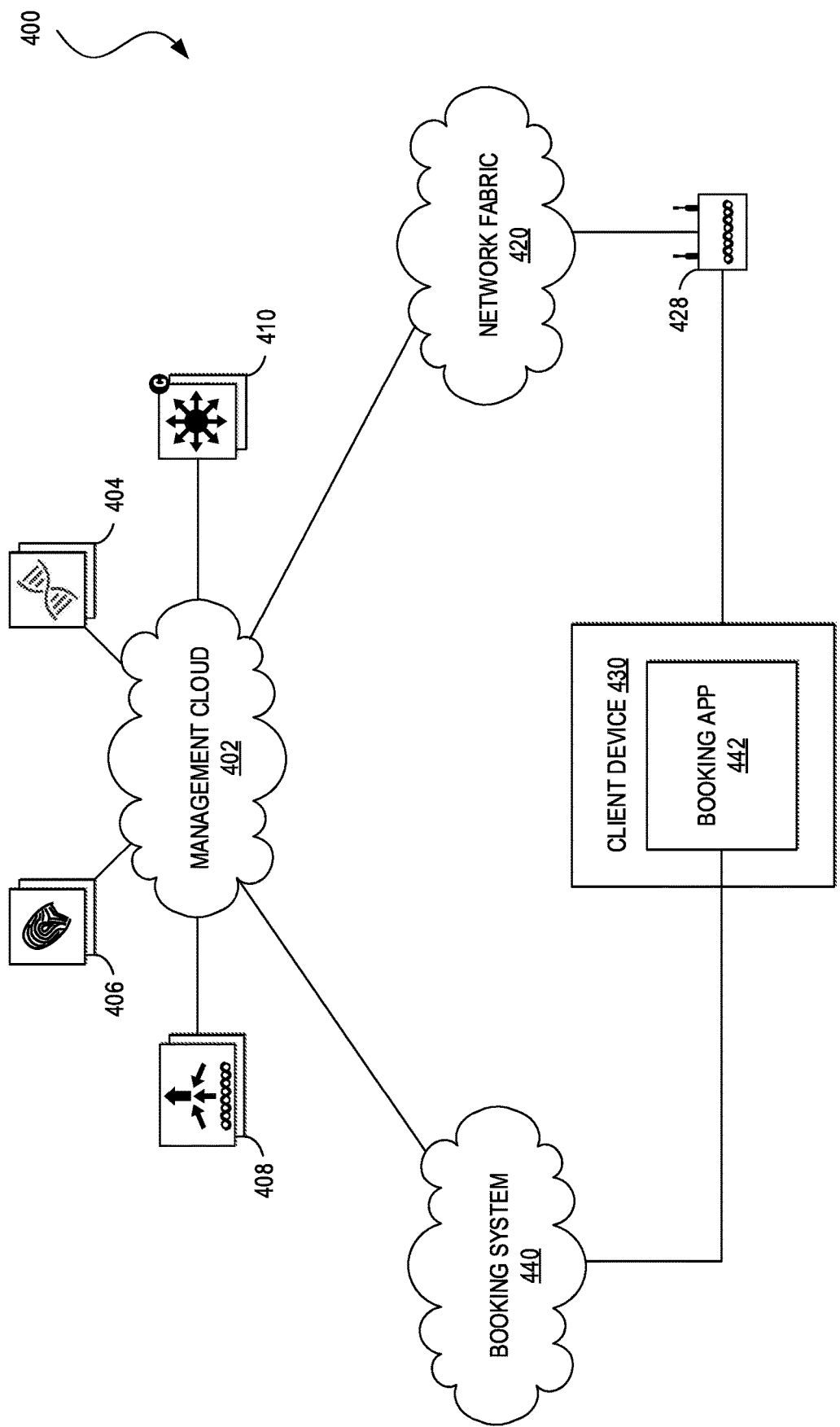
FIG. 4 illustrates an example of a network environment in accordance with an embodiment.

FIG. 4 illustrates an example of a network environment 400 for showing certain aspects of the present disclosure. The network environment 400 can include a management cloud 402, a network fabric 420, a wireless access point (AP) 428, a client device 430, and a booking system 440. In some embodiments, the management cloud 402, the network fabric 420, the wireless AP 428, and the client device 430 may operate the same as or similarly to the management cloud 102, the network fabric 120, the AP 128, and the client device 130, respectively. For example, the management cloud 402 can include one or more network controllers 404, one or more authentication, authorization, and accounting (AAA) appliances 406, one or more wireless local area network controllers (WLCs) 408, and one or more fabric control plane nodes 410 that can operate the same as or similarly to the network controller(s) 104, the AAA appliance(s) 106, the WLC(s) 108, and the fabric control plane node(s), respectively.

In this example, the client device 430 may be connected wirelessly to the network fabric 420 by the wireless AP 428. The client device 430 can also include a booking application (or app) 442 for connecting to the booking system 440. The booking app 442 may be used to interface with the booking system 440 to reserve a shared use space and retrieve details regarding the reservation, including network access information. The booking system 440 may interface with one or more elements of the management cloud 402 to set up network access within a shared use space in which the wireless AP 428 is located. For example, the management cloud 402 may be capable of managing the AP 428, service set identifiers (SSIDs), and authentication schemes in the shared use space. The management cloud 402 can receive a request for a tenant SSID or an SSID of a specified duration and distributed authentication for network access within the shared use space in which the wireless AP 428 is located. The management cloud 402 can transmit the tenant SSID and authentication data (e.g., an SSID authentication token, an ISPK, etc.) to the booking system 440. The client device 430 can then receive this information from the booking system 440, such as via the booking app 442.

In some embodiments, the client device 430 can operate as a primary guest device used for connection to and authentication by the wireless AP 428. Upon connection and authentication, the client device 430 can be used to directly authenticate one or more secondary guest devices. In some embodiments, the client device 430 may operate directly as an authentication server. In other embodiments, the client device 430 may operate indirectly as an authentication, such as when the client device 430 is a designated "Guest Confirmation Server" of the AAA appliance(s) 406.

In some embodiments, guest access (e.g., access by one or more primary guest devices or secondary guest devices) may be encrypted using WPA3 Opportunistic Wireless Encryption (OWE) or by using a well-known IPSK (e.g., the tenant SSID).

Figure 5A:
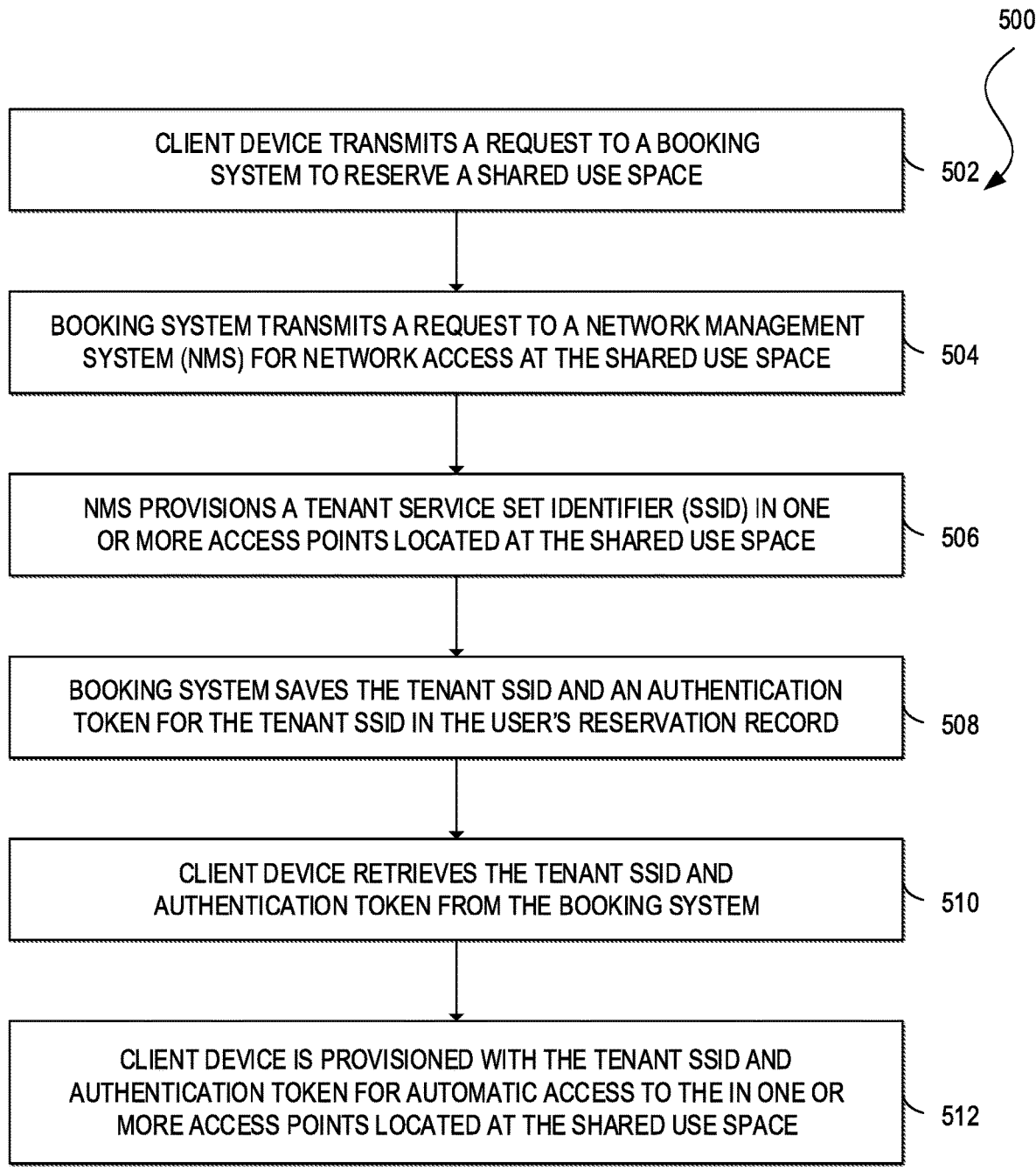
FIGS. 5A and 5B illustrate examples of first set of processes for providing network access using tenant service set identifiers (SSIDs) in accordance with an embodiment.

FIG. 5A illustrates an example of a process 500 for provisioning a tenant service set identifier (SSID) in one or more access points located within a shared use space. The SSID may be characterized as a tenant SSID because it is time-limited (e.g., network access is provided for a specified duration) and supports a distributed authorization scheme (e.g., upon authentication, a primary guest device can authorize one or more secondary guest devices to access the network). One of ordinary skill will understood that, for any processes discussed herein, there can be additional, fewer, or alternative steps performed in similar or alternative orders, or in parallel, within the scope of the various embodiments unless otherwise stated.

In some embodiments, the process 500 may be performed at least in part by a client device (e.g., the client device 130 or 430), a booking application executing on the client device (e.g., the booking app 442), a booking system (e.g., the booking system 440), a management cloud (e.g., the management cloud 102 or 402) or one or more elements of the management cloud (e.g., the network controller appliance(s) 104 or 404, the AAA appliance(s) 406, the WLC(s) 408, and/or the fabric control node(s) 110 or 410 (collectively, a network management system), and/or one or more APs (e.g., the wireless AP(s) 128 or 428). However, some embodiments may exclude the booking system and booking application, or integrate the operations of these elements in one or more other elements of the system.

The process 500 may begin with step 502 in which a user can make a reservation for a shared use space (e.g., homestay, shared use office space, etc.) using an interface associated with the booking system, such as the booking application running on the client device. In some embodiments, the client device can operate as a primary guest device.

The process 500 can proceed to step 504 in which the booking system can transmit a request to the network management system for network access at the shared use space for the duration that the user has reserved via the booking app. In some embodiments, the booking system can provide the MAC address and device type of the primary guest device, the location of the shared use space and/or AP(s) located at the shared use space, and the start time and end time for the network access.

At step 506, the network management system can provision a wireless local area network (WLAN) and the tenant SSID in the AP(s) (e.g., configure the AP(s) to enable the primary client device to automatically connect to and be authenticated by the AP(s) via the tenant SSID). For example, the network management system can add the tenant SSID to the AP(s) (and disable the tenant SSID by default), generate an authentication token for the tenant SSID, distribute the token to the AP(s), configure the WLAN and a shared virtual LAN (VLAN) to allow guest devices that connect to the WLAN via the tenant SSID to access devices on the shared VLAN (e.g., automated entry devices, office equipment, etc.), transmit the tenant SSID and authentication token to the booking system, and create instructions to activate the tenant SSID at the specified start time and disable the SSID at the specified end time. The instructions may include a script; an application programming interface (API); a workflow of a configuration management tool, such as CFEngine™, Puppet™, Chef™, Ansible®, SaltStack®, etc; and so forth. In some embodiments, the network management system may run the activation/deactivation instructions at the specified start and end times. In other embodiments, the network management system can transmit the activation/deactivation instructions to the AP(s) for execution.

At step 508, the booking system can save the tenant SSID and authentication token in the user's reservation record. At step 510, the booking app on the primary guest device can retrieve the tenant SSID and authentication data from the booking system. The process 500 may conclude with step 512 in which the booking app may provision the primary guest device with the tenant SSID and authentication token, such as by storing the tenant SSID as a "known network" along with the authentication token on the primary guest device. In this manner, the primary guest device can automatically connect to and be authenticated by the AP(s) and obtain access to the VLAN/WLAN associated with the shared use space when the primary guest device comes into a range of the AP(s). In some embodiments, client devices may also acquire authorization to control one or more other devices of the VLAN/WLAN (e.g., automated entry devices, office equipment, etc.).

Figure 5B:
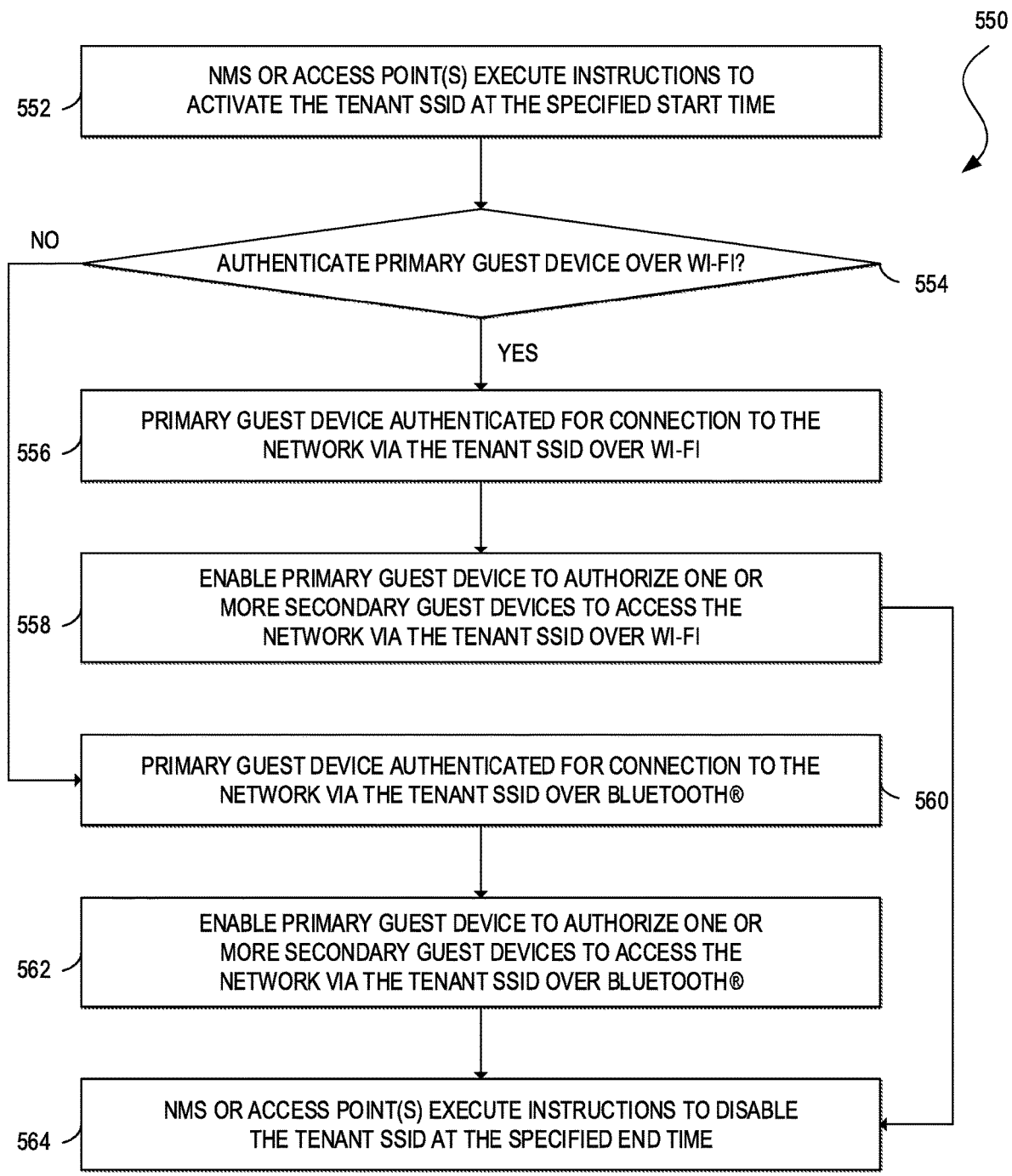

FIG. 5B illustrates an example of a process 550 for enabling a primary guest device to authorize one or more secondary guest devices to access a network via the tenant SSID. The process 550 can begin with step 552 in which the network management system and/or AP(s) can execute the instructions (e.g., created at step 506) to activate the SSID at the specified start time.

The process 550 can proceed to decision block 554 in which the AP(s) can determine whether authentication can occur via Wi-Fi or other medium (e.g., Bluetooth®). If authentication can occur over Wi-Fi, the process 550 may continue to step 556 in which the primary guest device can connect to the network using the SSID and authentication token retrieved from the booking system (e.g., at step 510) when the primary guest device is within Wi-Fi range of the AP(s). For example, the primary guest device may automatically connect to and be authenticated by the AP(s) if the SSID has been configured as a "known network" on the primary guest device (e.g., at step 512). In some embodiments, the first AP to which the primary guest device connects may signal other AP(s) in the shared use space to configure the primary guest device as the authorization server for the tenant SSID. Alternatively or in addition, the first AP can transmit a request to the network management system to signal the other AP(s) to configure the primary guest device as the authorization server for the SSID. In this manner, guest devices can seamlessly connect to other AP(s) in the shared use space with the primary guest device designated as the authorization server for the tenant SSID.

At step 558, the network management system and/or AP(s) can enable the primary guest device to authorize one or more secondary guest devices access to the WLAN/VLAN via the SSID over Wi-Fi. For example, if a secondary guest device attempts to connect to the AP(s) using the tenant SSID, the AP(s) can query the primary guest device (operating as the designated authentication server) to determine whether to grant network access to the secondary guest device. In some embodiments, the primary guest device can be utilized by a user to manually authorize the secondary guest device to access the network. The authorization request from the AP can include the name of the user of the secondary guest device, the secondary guest device's name, MAC address, or other identifier associated with the user of the secondary guest device or the secondary guest device. In other embodiments, the primary guest device can automatically authorize the secondary device to access the network via the tenant SSID if the secondary guest device is a member of a set of approved devices (e.g., a client device whitelist, contact list, etc.). For example, the primary guest device can automatically authorize the secondary guest device to access the network via the tenant SSID by storing the secondary guest device's MAC address in a client device whitelist once the secondary guest device has been authorized by the primary guest device at least one time. In some embodiments, the AP(s) can whitelist approved secondary guest devices for the tenant SSID upon authorization by the primary client device, such as by adding the secondary guest device's MAC address or other identifier and the tenant SSID to a whitelist stored on the AP(s).

Returning to the decision block 554, if authentication cannot occur over Wi-Fi but can occur over another medium (e.g., Bluetooth®), the process 550 can proceed to step 560 in which the primary guest device can connect to the network via the tenant SSID when the primary guest device is within Bluetooth® range of the AP(s). The primary guest device can then register to receive Bluetooth® notifications from the AP(s). At step 562, the network management system and/or AP(s) can enable the primary guest device to authorize one or more secondary guest devices for access to the WLAN/VLAN via the tenant SSID over Bluetooth®. For example, the AP(s) can designate the primary client device as the authorization server for the tenant SSID. If a secondary guest device attempts to connect to the AP(s) using the tenant SSID over Bluetooth®, the AP(s) can transmit a request over Bluetooth® to the primary guest device to authorize the secondary guest device to access the network. The primary guest device can manually or automatically authorize the secondary guest device and transmit a response to the AP(s) over Bluetooth®. In some embodiments, the AP(s) can whitelist approved secondary guest devices for the tenant SSID upon authorization by the primary client device, such as by adding the secondary guest device's MAC address or other identifier and the tenant SSID to a whitelist stored on the AP(s).

The process 550 may conclude with step 564 in which the network management system or AP(s) execute the instructions to disable and/or remove the tenant SSID at the specified end time.

Figure 6A:
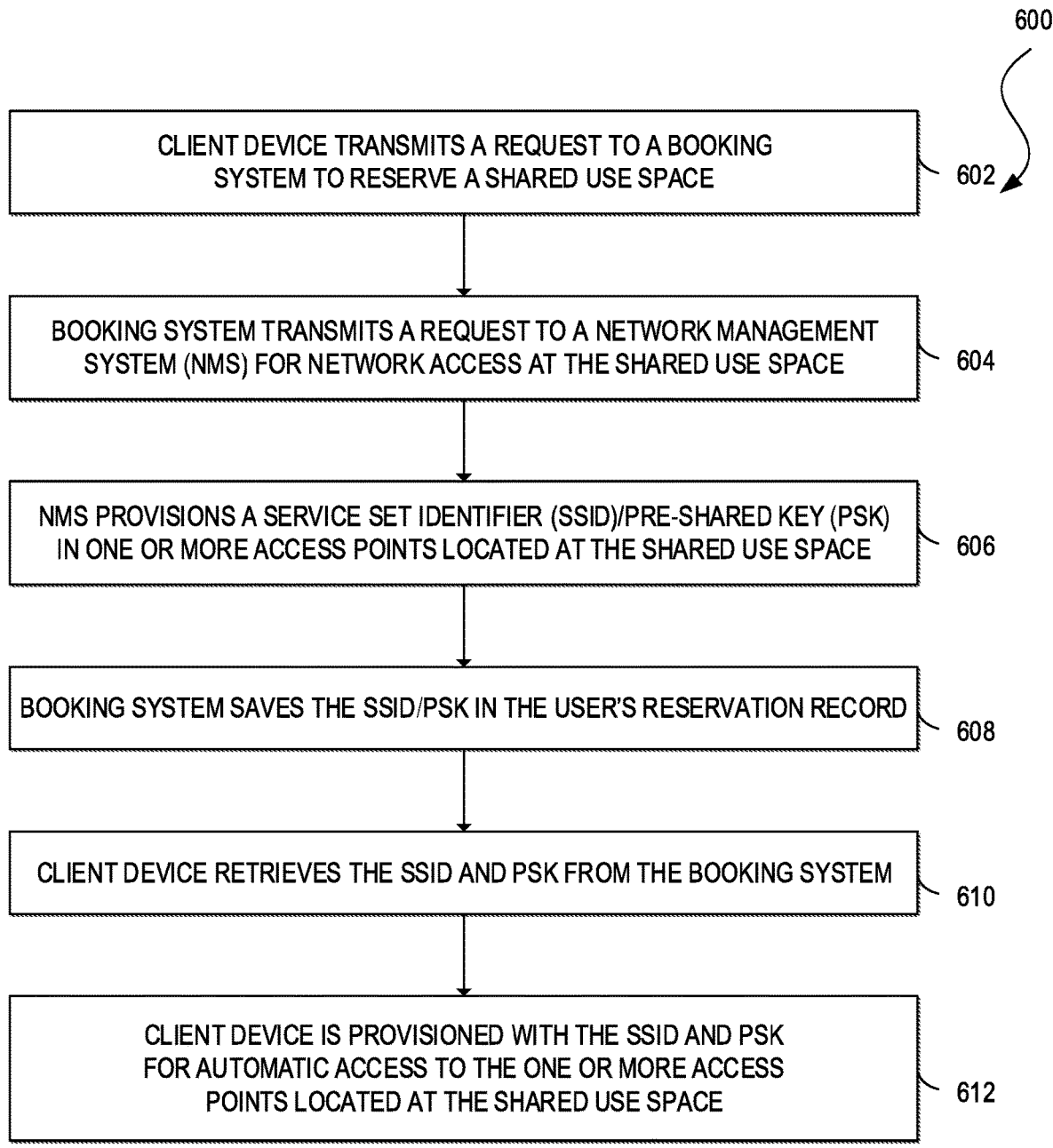
FIGS. 6A and 6B illustrate examples of a second set of processes for providing network access using tenant SSIDs in accordance with an embodiment.

FIG. 6A illustrates an example of a process 600 for provisioning a service set identifier (SSID)/Pre-Shared Key (PSK) in one or more access points located within a shared use space. In some embodiments, the process 600 may be performed at least in part by a client device (e.g., the client device 130 or 430), a booking application operating on the client device (e.g., the booking app 442), a booking system (e.g., the booking system 440), a management cloud (e.g., the management cloud 102 or 402) or one or more elements of the management cloud (e.g., the network controller appliance(s) 104 or 404, the AAA appliance(s) 406, the WLC(s) 408, and/or the fabric control node(s) 110 or 410 (collectively, a network management system), and/or one or more APs (e.g., the wireless AP(s) 128 or 428).

The process 600 may begin with step 602 in which a user can make a reservation for a shared use space using an interface associated with the booking system, such as the booking application running on the client device. In some embodiments, the client device can operate as a primary guest device.

The process 600 can proceed to step 604 in which the booking system can transmit a request to the network management system for network access at the shared use space for the duration that the user has reserved via the booking app. In some embodiments, the booking system can provide the MAC address and device type of the primary guest device, the location of the shared use space and/or AP(s) located at the shared use space, and the start time and end time for the network access.

At step 606, the network management system can provision a wireless local area network (WLAN) and the SSID/PSK in the AP(s) (e.g., configure the AP(s) to enable the primary client device to automatically connect to and be authenticated by the AP(s) via the SSID/PSK). For example, the network management system can add the SSID to the AP(s) (if there is no SSID already configured for usage by guest devices), receive the SSID/PSK for the primary guest device from the AAA appliance(s), and transmit the SSID/PSK to the booking system. In this case, the SSID may be a characterized as a multi-tenant SSID with differentiated access based on the PSK. The differentiated access may include time-limited access (e.g., network access is provided for a specified duration) and may support a distributed authorization scheme (e.g., upon authentication, a primary guest device can authorize one or more secondary guest devices to access the network).

At step 608, the booking system can save the SSID/PSK in the user's reservation record. At step 610, the booking app on the primary guest device can retrieve the SSID/PSK from the booking system. The process 600 may conclude with step 612 in which the booking app may provision the primary guest device with the SSID/PSK, such as by storing the SSID as a "known network" along with the PSK on the primary guest device. In this manner, the primary guest device can automatically connect to and be authenticated by the AP(s) via the SSID/PSK and obtain access to the VLAN/WLAN associated with the shared use space. In some embodiments, the primary guest device may also acquire authorization to control one or more other devices of the VLAN/WLAN (e.g., automated entry devices, office equipment, etc.).

Figure 6B:
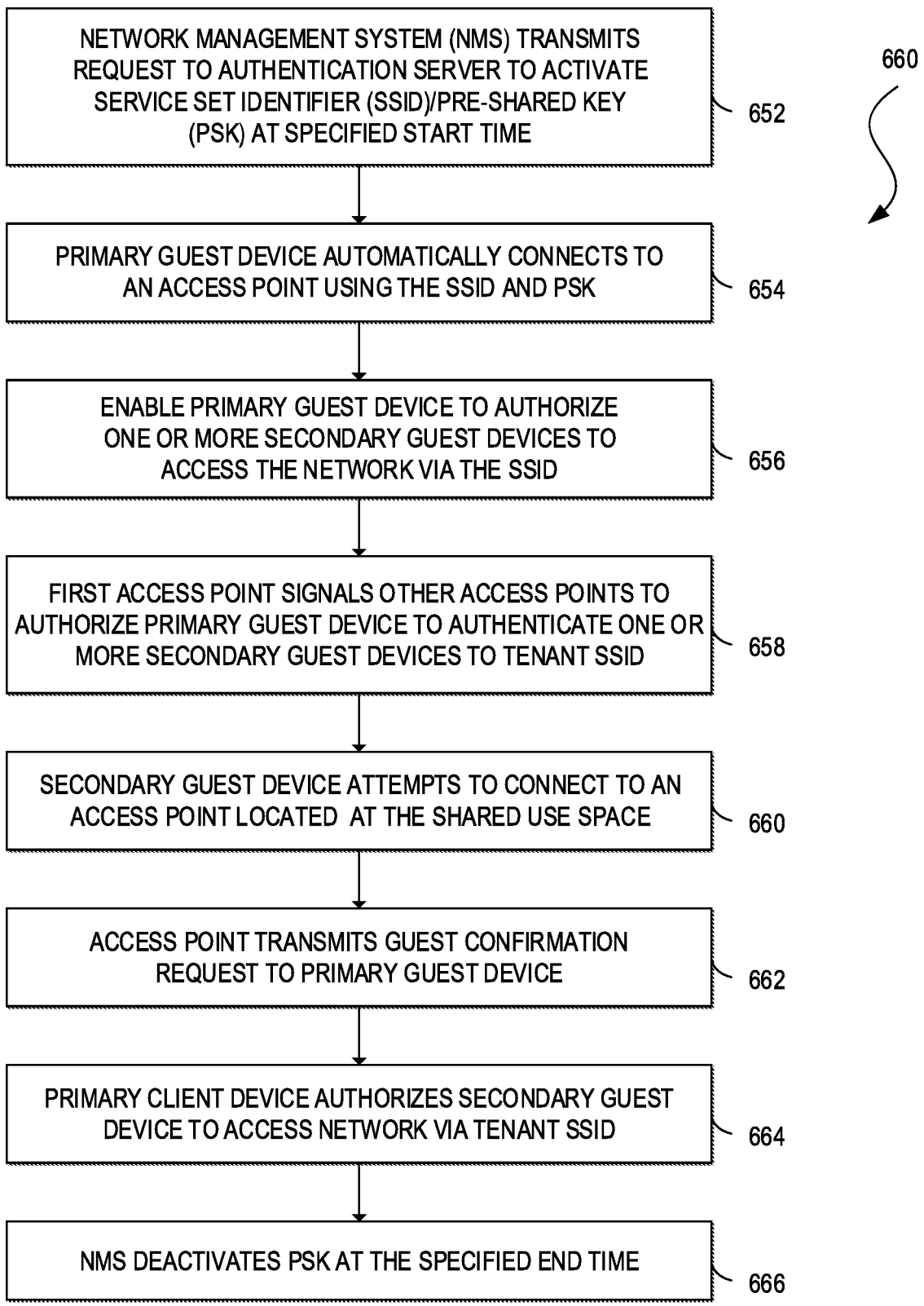

FIG. 6B illustrates an example of a process 650 for enabling a primary guest device to authorize one or more secondary guest devices to access a network. The process 650 can begin with step 652 in which the network management system and/or AP(s) can activate the SSID/PSK for the primary guest device at the specified start time. In some embodiments, one or more Cisco® Identity Service Engine (ISE) appliances can operate as the AAA appliance(s). The Cisco® ISE appliance(s) can maintain mappings of MAC addresses of client devices, PSKs, and SSIDs, including a mapping of the MAC address of the primary guest device, the PSK of the primary guest device, and the SSID of the shared use space. At the specified start time, the network management system and/or AP(s) can send a request to the Cisco® ISE appliance(s) to activate the SSID/PSK for the primary guest device.

At step 654, the primary guest device can connect to the network using the SSID/PSK retrieved from the booking system (e.g., at step 610). For example, the primary guest device may attempt to connect to the AP(s) using the SSID/PSK when the primary guest device is within a range of the AP(s) (e.g., Wi-Fi range, Bluetooth® range, etc.). In response to the attempt to connect, the AP(s) can transmit a request to the AAA appliance(s) for the PSK mapped to the MAC address of the primary guest device and the SSID. Since the AAA appliance(s) have previously mapped the PSK to the MAC address of the primary guest device and the SSID (e.g., at step 652), the AAA appliance(s) can return this PSK. The AAA appliance(s) can successfully authenticate the primary guest device using this PSK, and send a response back to the AP(s) indicating successful authentication.

At step 656, the AP(s) can enable the primary guest device to authorize one or more secondary guest devices to access the network via the SSID. For example, the first AP to which the primary guest device attempts to connect can add the IP address and MAC address of the primary guest device and the SSID to a "Guest Confirmation Server" table upon authentication of the primary guest device by the AAA appliance(s). Then, at step 658, the first AP can signal other APs (if any) in the shared use space to update their "Guest Confirmation Server" tables with the IP and MAC addresses of the primary guest device and the SSID. The first AP may signal the other APs directly or indirectly via the network management system. In this manner, the primary guest device and secondary guest devices can seamlessly connect to the other APs (if any) in the shared use space.

At step 660, a secondary guest device may attempt to connect to one of the APs located at the shared use space. In response to this attempt to connect, at step 662, this AP can transmit a guest confirmation request to one or more guest devices in the "Guest Confirmation Server" table (e.g., the primary guest device). In some embodiments, the AP may limit transmission of the guest confirmation request to devices within a predefined distance of the secondary guest device or within (or outside of) a geofence, geographic boundary, or other location. For example, the AP can compare the location and/or received signal strength indicator (RSSI) values of the guest devices in the "Guest Confirmation Server" table with the location and RSSI values of the new secondary guest device. If the comparison indicates that the secondary guest device is within the predefined distance of any guest devices in the "Guest Confirmation Server" table, the AP can transmit the guest confirmation request to these devices. In this manner, the AP can prevent transmission of confirmation requests to unintended primary guest devices.

At step 664, the primary guest device (and/or other guest devices in the "Guest Confirmation Server" table) can authorize the secondary guest device to access the network via the SSID. In some embodiments, the primary guest device can be used to manually authorize the secondary guest device in response to the guest confirmation request. For example, the primary guest device can display a prompt requesting a user to authorize the secondary guest device to access the network via the SSID. The request can include one or more of a user name of the secondary guest device, a name of the secondary guest device name, the MAC address of the secondary guest device, and/or other identifier associated with the user of the secondary guest device or the secondary guest device. In other embodiments, the primary guest device can automatically authorize the secondary guest device to connect to the network via the SSID if the secondary guest device is a member of a set of approved devices (e.g., a client device whitelist, contact list, etc.). For example, the primary guest device can automatically authorize the secondary guest device to access the network via the SSID by storing the secondary guest device's MAC address in a client device whitelist once the secondary guest device has been authorized by the primary guest device at least one time.

In some embodiments, the primary guest device may transmit the PSK to the AP as part of the authorization of the secondary guest device. The AP(s) can use the MAC address of the primary guest device and the PSK to validate the secondary guest device with the AAA appliance(s). Alternatively, or in addition, the first AP to which the secondary guest device attempts to connect to can whitelist the secondary guest device upon authorization by the primary guest device. For example, the first AP can store the MAC address of the secondary guest device and the PSK as a whitelisted device for the SSID upon a request from the primary guest device. Then, the AP can transmit a request to the AAA appliance(s), including the PSK, to add the MAC address of the secondary guest device as a whitelisted MAC address for the SSID.

In other embodiments, the network management system can be notified of authorization of the secondary guest device to access the network via the SSID. For example, the AP can directly notify the network management system regarding the secondary guest device. As another example, the primary guest device can inform the booking system that the primary guest device has authorized the secondary guest device to access the SSID, and the booking system can transmit a request to the network management system to whitelist the secondary guest device. Upon the network management system being notified that the secondary guest device has been authorized to access the network via the SSID, the network management system can transmit a request to the AAA appliance(s) to associate the MAC address of the secondary guest device, the PSK of the primary guest device, and the SSID of the primary guest device.

In some embodiments, the first AP may signal other APs in the shared use space to whitelist the secondary guest device with the PSK, such as by associating the MAC address of the secondary guest device, the PSK of the primary guest device, and the SSID of the primary guest device. In this manner, if the secondary guest device disconnects from the network and tries to join another AP (e.g., a target AP) in the shared use space, then the target AP can retrieve the PSK value associated with the secondary guest device from the AAA appliance(s) and check if the received PSK value matches the value in the whitelisted MAC table.

The process 650 may conclude with step 666 in which the network management system can deactivate the PSK at the specified end time. For example, the network management system can clear the IPSK entries associated with the primary guest device's PSK from the AAA appliance(s) and clear the whitelist entries associated with the PSK from the AP(s) in the shared use space. This can effectively disable the primary guest device and whitelisted secondary guest devices from accessing the network via the SSID.

To support the functionality discussed above, a network management system (e.g., Cisco DNA™ Center) can be configured to generate time-limited SSIDs and provision these SSIDs in the APs of a network, generate time-limited PSKs and activate them in one or more AAA servers (e.g., Cisco® ISE), and add/remove the time-limited PSKs from the AAA server(s) (including adding the PSKs at a specified start time and removing the PSKs at a specified end time).

Some of the benefits of the approaches discussed above with respect to FIGS. 5A, 5B, 6A, and 6B include the capability of an access point to enable a primary guest device to authorize one or more secondary guest devices to access network upon authentication of the primary guest device, the capability of a network management system and/or one or more APs to create and manage SSIDs of limited duration and distributed authorization, the capability of an AP to support a "Guest Confirmation Server" for distributing authorization to access a network to a primary guest device, the capability of a network management system and/or one or more APs to limit guest confirmation requests to primary guest devices based on location data, the capability of providing real-time updates of whitelisted devices to an AAA server, and the capability of a network management system and/or one or more APs to create and manage time-limited PSKs that can be used for limiting access to a network via a particular SSID to a specified duration.

FIG. 7 illustrates an example of a network device 700 (e.g., switch, router, network appliance, etc.). The network device 700 can include a master central processing unit (CPU) 702, interfaces 704, and a bus 706 (e.g., a PCI bus). When acting under the control of appropriate software or firmware, the CPU 702 can be responsible for executing packet management, error detection, and/or routing functions. The CPU 702 preferably accomplishes all these functions under the control of software including an operating system and any appropriate applications software. The CPU 702 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 710 (such as non-volatile RAM and/or ROM) can also form part of the CPU 702. However, there are many different ways in which memory could be coupled to the system.

The interfaces 704 can be provided as interface cards (sometimes referred to as line cards). The interfaces 704 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 704 may include ports appropriate for communication with the appropriate media. In some cases, the interfaces 704 may also include an independent processor and, in some instances, volatile RAM. The independent processors may control communication intensive tasks such as packet switching, media control, and management. By providing separate processors for the communication intensive tasks, the interfaces 704 may allow the CPU 702 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 710) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 8A:
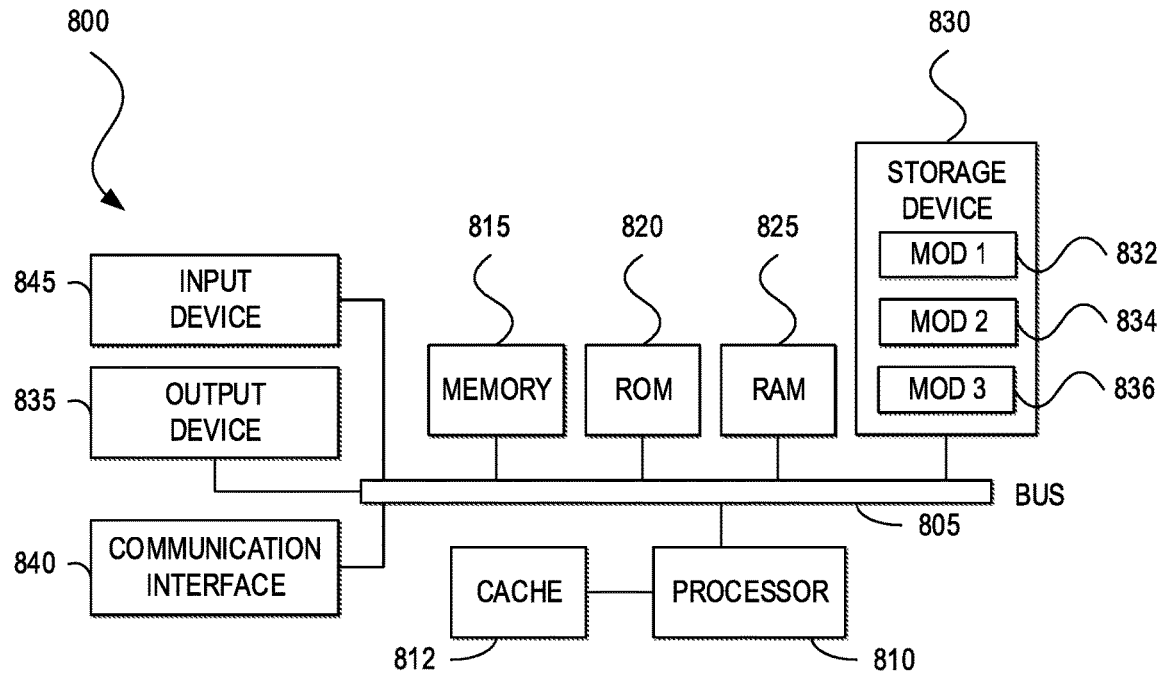
FIGS. 8A and 8B illustrate examples of systems in accordance with some embodiments.
Figure 8B:
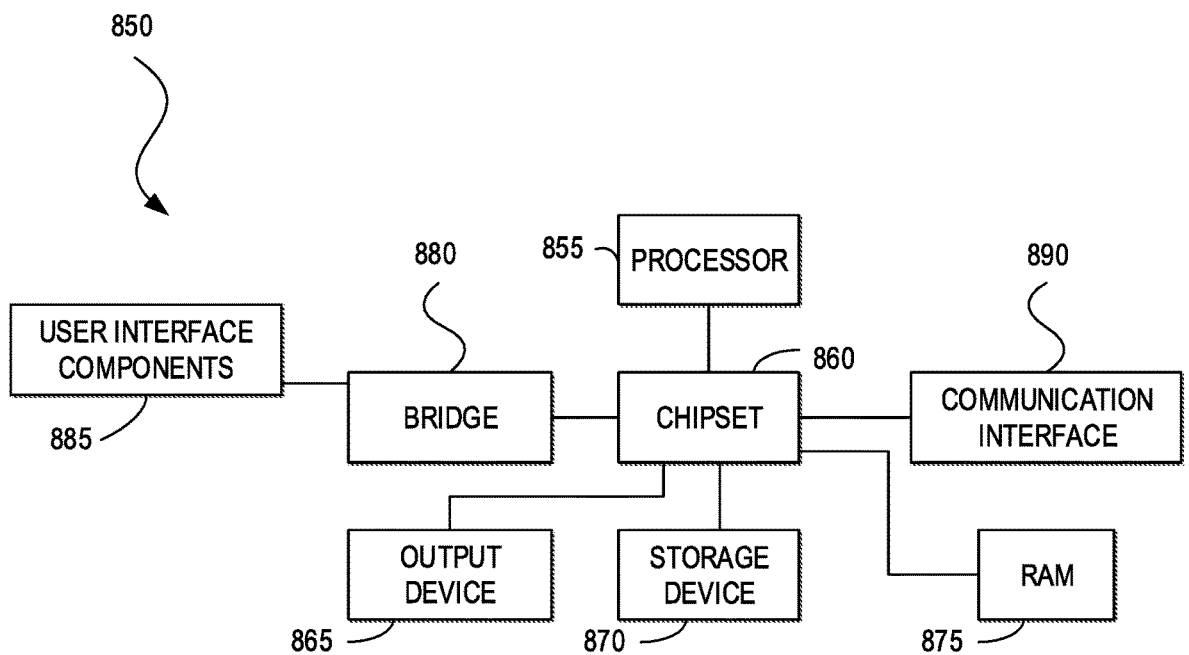

FIG. 8A and FIG. 8B illustrate systems in accordance with various embodiments. The more appropriate system will be apparent to those of ordinary skill in the art when practicing the various embodiments. Persons of ordinary skill in the art will also readily appreciate that other systems are possible.

FIG. 8A illustrates an example of a bus computing system 800 wherein the components of the system are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

FIG. 8B illustrates an example architecture for a chipset computing system 850 that can be used in accordance with an embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, solid state media, and other suitable storage media. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 855 analyzing data stored in the storage device 870 or the RAM 875. Further, the computing system 850 can receive inputs from a user via the user interface components 885 and execute appropriate functions, such as browsing functions by interpreting these inputs using the processor 855.

It will be appreciated that computing systems 800 and 850 can have more than one processor 810 and 855, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
receiving a request to reserve a shared workspace for a specific time period, the shared workspace including at least access to a physical location and access to a wireless local area network (WLAN);
provisioning a service set identifier (SSID) to be activated for the specific time period in an access point to enable a first client device to access the WLAN for a specified time period, wherein upon expiration of the specific time period the SSID is disabled;

transmitting the SSID and authentication data for receipt by the first client device;

transmitting access, via the SSID, to and automated entry device at the physical location for receipt by the first client device;

in response to successfully authenticating the first client device, enabling the first client device to authorize a second client device to access the WLAN; and providing the second client device with access to the WLAN upon authorization by the first client device.

2. The computer-implemented method of claim 1, wherein the authentication data includes an authentication token for the SSID.

3. The computer-implemented method of claim 2, further comprising:

generating first instructions to activate the SSID at a start time of the specified time period;

generating second instructions to disable the SSID at an end time of the specified time period;

causing the first instructions to be executed at the start time; and causing the second instructions to be executed at the end time.

4. The computer-implemented method of claim 1, further comprising:

notifying one or more second access points of the WLAN that the first client device is an authorization server for the SSID.

5. The computer-implemented method of claim 1, wherein the authentication data includes a Pre-Shared Key (PSK) that is associated with the first client device and the SSID and that is received from an authentication, authorization, and accounting (AAA) server.

6. The computer-implemented method of claim 5, further comprising:

causing the PSK to be activated at a start time of the specified time period; and causing the PSK to be disabled at an end time of the specified time period.

7. The computer-implemented method of claim 1, further comprising:

receiving a request from the second client device to connect to the WLAN via the SSID;

transmitting a request to the first client device to authorize the second client device to access the WLAN via the SSID; and receiving the authentication data from the first client device in response to the first client device authorizing the second client device to access the WLAN.

8. The computer-implemented method of claim 7, further comprising:

receiving location data of the second client device, wherein transmitting the request to the first client device to authorize the second client device to access the WLAN via the SSID occurs in response to determining whether the second client device is within a specified distance from the first client device based on the location data.

9. The computer-implemented method of claim 1, further comprising:

configuring the WLAN and a virtual local area network (VLAN) to allow a client device that connects to the WLAN via the SSID to access one or more third devices connected to the VLAN.

10. The computer-implemented method of claim 1, further comprising:

provisioning the SSID in the first client device for automatic connection to and authentication by the access point.

11. The computer-implemented method of claim 1, further comprising:

receiving a request for access to the WLAN for the first client device for the specified time period from a booking system; and transmitting the SSID and the authentication data to the booking system in response to the request for access to the WLAN for the first client device for the specified time period.

12. The computer-implemented method of claim 11, further comprising:

receiving, by an application executing on the client device, a request to reserve a space at the physical location for the specified time period;

receiving, by the application, the SSID and the authentication data; and provisioning, by the application, automatic connection and authentication of the first client device for access to the WLAN by the one or more access points using the SSID and the authentication data.

13. A system, comprising:

one or more processors; and memory including instructions that, when executed by the one or more processors, cause the system to:

receive a request to reserve a shared workspace for a specific time period, the shared workspace including at least access to a physical location and access to a wireless local area network (WLAN);

provision a service set identifier (SSID) to be activated for the specific time period in an access point to enable a first client device to access the WLAN for a specified time period, wherein upon expiration of the specific time period the SSID is disabled;

transmit the SSID and authentication data for receipt by the first client device;

transmit access, via the SSID, to and automated entry device at the physical location for receipt by the first client device;

in response to successfully authenticating the first client device, enable the first client device to authorize a second client device to access the WLAN; and provide the second client device with access to the WLAN upon authorization by the first client device.

14. The system of claim 13, wherein the instructions, when executed, further cause the system to:

receive the SSID and the authentication data from the first client device over Bluetooth; and register the first client device to receive one or more notifications from the access point over Bluetooth.

15. The system of claim 13, wherein the instructions, when executed, further cause the system to:

add an identifier of the second client device to a whitelist that is stored on the first client device and that automatically authorizes client devices identified in the whitelist to access the WLAN via the SSID.

16. The system of claim 13, wherein the instructions, when executed, further cause the system to:

add an identifier of the second client device to a plurality of whitelists that are stored on a plurality of access points of the network and that automatically authorizes client devices identified in each of the plurality of whitelists to access the WLAN via the SSID.

17. A non-transitory computer-readable storage medium including instructions that, upon being executed by one or more processors of a system, cause the system to:
- receive a request to reserve a shared workspace, the shared workspace including at least access to a physical location and access to a wireless local area network (WLAN);
- provision a service set identifier (SSID) to be activated for the specific time period in an access point to enable a first client device to access the WLAN for a specified time period, wherein upon expiration of the specific time period the SSID is disabled;
- transmit the SSID and authentication data for receipt by the first client device;
- transmit access, via the SSID, to and automated entry device at the physical location for receipt by the first client device;
- in response to successfully authenticating the first client device, enable the first client device to authorize a second client device to access the WLAN; and
- provide the second client device with access to the WLAN upon authorization by the first client device.

18. The non-transitory computer-readable storage medium of claim 17, wherein the instructions, when executed, further cause the system to:
- add an identifier of the first client device and the SSID to a Guest Confirmation Server table of the access point.

19. The non-transitory computer-readable storage medium of claim 18, wherein the instructions, when executed, further cause the system to:
- receive a request from the second client device to connect to the WLAN via the SSID;
- transmit a request to one or more client devices identified in the Guest Confirmation Server table to authorize the second client device to access the WLAN via the SSID; and
- receive the authentication data from the one or more client devices in response to the one or more devices authorizing the second client device to access the WLAN.

20. The non-transitory computer-readable storage medium of claim 18, wherein the instructions, when executed, further cause the system to:
- encrypt first network traffic between the access point and the first client device; and
- encrypt second network traffic between the access point and the second client device.

* * * * *